United States Patent [19]

Scarpa

[11] Patent Number: 5,400,084
[45] Date of Patent: Mar. 21, 1995

[54] METHOD AND APPARATUS FOR NTSC SIGNAL INTERFERENCE CANCELLATION USING RECURSIVE DIGITAL NOTCH FILTERS

[75] Inventor: Carl G. Scarpa, Edison, N.J.

[73] Assignee: Hitachi America, Ltd., Tarrytown, N.Y.

[21] Appl. No.: 103,933

[22] Filed: Aug. 6, 1993

Related U.S. Application Data

[63] Continuation-in-part of Ser. No. 3,714, Jan. 13, 1993, abandoned, which is a continuation-in-part of Ser. No. 882,851, May 14, 1992, abandoned.

[51] Int. Cl.⁶ .................... H04N 5/44; H04N 11/00; H04N 5/21
[52] U.S. Cl. .................... 348/624; 348/607; 348/711; 455/307; 375/350
[58] Field of Search .................... 358/36, 12, 167, 141, 358/142, 188, 38, 149, 31, 196, 37, 166; H04N 5/21, 7/00, 11/00, 5/44; 455/296, 295, 306, 307, 305, 303; 375/103, 99, 101; 364/724.17, 724.19, 724.01, 724.08, 724.06; 328/166, 167; 330/176, 167, 166; 348/624, 607, 614, 606, 725, 711, 512, 520, 537, 539, 536, 736, 426, 549, 735, 470

[56] References Cited

U.S. PATENT DOCUMENTS

| | | | |
|---|---|---|---|
| 3,744,015 | 7/1973 | Marimon et al. | 455/307 |
| 3,967,102 | 6/1976 | McCown | 364/724.19 |
| 4,117,541 | 9/1978 | Ali | 364/724 |
| 4,199,660 | 4/1980 | Dill et al. | 370/50 |
| 4,480,236 | 10/1984 | Harris | 333/174 |
| 4,549,312 | 10/1985 | Michaels et al. | 455/311 |
| 4,589,083 | 5/1986 | LeDinh et al. | 364/724 |
| 4,667,225 | 5/1987 | Kanda | 358/167 |
| 4,673,982 | 6/1987 | Tam et al. | 358/167 |
| 4,954,785 | 9/1990 | Segaram | 328/167 |
| 5,031,194 | 7/1991 | Crespo et al. | 375/14 |
| 5,051,963 | 9/1991 | Linville, Jr. et al. | 364/724.01 |
| 5,058,139 | 10/1991 | Egler | 375/103 |
| 5,086,340 | 2/1992 | Citta et al. | 358/141 |
| 5,087,975 | 2/1992 | Citta et al. | 358/183 |
| 5,121,203 | 6/1992 | Citta | 358/141 |
| 5,121,208 | 6/1992 | Citta et al. | 358/166 |
| 5,132,797 | 7/1992 | Citta | 358/167 |
| 5,136,386 | 8/1992 | Okada et al. | 358/167 |
| 5,157,697 | 10/1992 | Anvari et al. | 455/295 |
| 5,162,900 | 11/1992 | Citta | 358/167 |
| 5,222,106 | 6/1993 | Satoh et al. | 375/102 |
| 5,235,612 | 8/1993 | Stilwell et al. | 375/102 |
| 5,263,048 | 11/1993 | Wade | 375/99 |

OTHER PUBLICATIONS

Dattorro, Jon, "The Implementation of Recursive Digital Filters for High-Fidelity Audio", J. Audio Eng Soc., vol. 36, No. 11, 1988 Nov., pp. 851–877.

(List continued on next page.)

*Primary Examiner*—James J. Groody
*Assistant Examiner*—Safet Metjahic
*Attorney, Agent, or Firm*—Kenyon & Kenyon

[57] ABSTRACT

A complex NTSC interference canceler for eliminating NTSC signal interference from in-phase and quadrature phase received television signals including both a desired HDTV signal and NTSC interference signal. The complex NTSC interference canceler uses a bank of complex recursive notch filters with adjustable center frequencies to isolate the NTSC signal's major components, i.e. the picture carrier signal, the chrominance subcarrier signal and the audio carrier signal. A single complex filter is used to isolate each NTSC interference signal component, with each particular filter's center frequency being adjusted to match the frequency of the particular NTSC interference signal component to be isolated by the filter. Each filter's gain may be either fixed or dynamically adjusted to match the amplitude of the NTSC interference signal component. Once isolated, the interference signal components are subtracted from the in-phase and quadrature phase received television signals.

20 Claims, 15 Drawing Sheets

OTHER PUBLICATIONS

E.P. Darbyshire, "Narrowband Interference Identification and Rejection Applied to Baseband Radio Signals", IEE Conference Publication no. 325. Published by IEE, Michael Faraday House, Stevenage, Engl., 1990, pp. 217-221.

General Instrument Corporation Videocipher Division, "Digicipher HDTV System Description", Aug. 22, 1991, pp. 31-40, pp. 49-60.

Zenith, AT&T, "Technical Details, Digital Spectrum Compatible", Sep. 23, 1991, pp. 3-4, 51-56, 67-110.

David Sarnoff Research Center, Philips Laboratories, "Advanced Digital Television, System Description", Jan. 20, 1992, pp. v-vii, 69-113.

Advanced Television Research Consortium, "Advanced Digital Television, Prototype Hardware Description", Feb. 12, 1992, pp. 8-10, 45-57.

McMann, R. H., et al., "A Digital Noise Reducer For Encoded NTSC Signals", SMPTE Journal, Mar. 1978, vol. 87, No. 3, pp. 129-133.

FILTER AMPLITUDE/PHASE RESPONSE

5,400,084

METHOD AND APPARATUS FOR NTSC SIGNAL INTERFERENCE CANCELLATION USING RECURSIVE DIGITAL NOTCH FILTERS

RELATED APPLICATION

This is a continuation-in-part of application Ser. No. 08/003,714, filed Jan. 13, 1993, now abandoned, which is a continuation-in-part of application Ser. No. 882,851, filed May 14, 1992, now abandoned.

FIELD OF THE INVENTION

The present invention is directed to signal interference cancelers and, more particularly, to an apparatus which uses a complex recursive digital filter to eliminate NTSC signal interference from television signals allowing for improved reception, referred to herein as high definition television ("HDTV") signals.

BACKGROUND OF THE INVENTION

Modern HDTV broadcasts will be required to coexist with the broadcast of NTSC (National Television Systems Committee) television broadcast signals presently in use. Since simulcasting will be used to accommodate HDTV broadcasts, an HDTV receiver will receive both an intended HDTV broadcast along with an unwanted NTSC broadcast. A problem of interference results from the presence of the NTSC broadcast being received, along with the HDTV broadcast signal.

NTSC interference caused by neighboring NTSC transmitters will be most severe at the fringe coverage area of the HDTV transmission region. At the fringe coverage area, the signal to noise ratio (SNR) of the HDTV broadcast will be at its lowest, with respect to the HDTV coverage area. Such a low SNR of the HDTV broadcast results in this fringe area since this is the broadcast region that is the greatest distance from the HDTV transmitter and, thus, it is an area which receives a relatively weak HDTV signal. Also, in the fringe coverage area the interfering NTSC signal will be at its largest, with respect to the coverage area of HDTV, since the distance to the NTSC transmitter increases and NTSC signal strength decreases, the further the NTSC broadcast signal travels away from the fringe area into the HDTV coverage area.

Thus, it is particularly in this fringe coverage area where NTSC broadcasts from neighboring broadcast regions will cause the most significant interference with an HDTV transmission.

Several proposed HDTV receivers use what is referred to as a baseband demodulator architecture. Such systems include a tuner for receiving a television signal which may include a HDTV signal and NTSC signal interference. An I.F. section is used to generate an I.F. signal from the television signal received by the tuner. In such systems, the generated I.F. signal may include the NTSC signal interference along with the desired HDTV signal. The proposed HDTV systems mix the I.F. signal down to baseband using analog techniques and a complex signal consisting of cos (ωt) and sin (ωt) waveforms to generate in-phase (hereinafter "I-") and quadrature phase (hereinafter "Q-") signals. To remove second order products, identical lowpass filtering is then performed on the resulting I- and Q- signals. The combination of the in-phase and quadrature components constitute a one sided analytic signal. In the proposed systems, this complex waveform consisting of the I- and Q- signals is then converted into the digital domain by two simultaneous analog to digital ("A/D") converters. Once in the digital domain, traditional demodulation processing is performed on the resulting signals, e.g., adaptive equalization, bit carrier synchronization, etc.

Approaches to solve the problem of NTSC signal interference should effectively eliminate the NTSC interference without severely attenuating what may be an already weak HDTV signal.

One known approach to solving the NTSC signal interference problem is the use of a comb filter which has notches spaced apart by a fixed amount each notch having a fixed depth and width to eliminate NTSC interference. In accordance with this approach, the received signal is first demodulated down to the baseband signal and then filtered. Such an approach has several disadvantages. For instanced the use of a comb filter degrades the noise performance of the system by 3 decibels (dB). This loss in detection probability is due to the very wide notches that are placed at the location of the NTSC interference carrier and is also due, in part, to the fact that the comb filter also contains additional notches where no interference is located. These additional notches cause the unnecessary attenuation of the HDTV signal in those areas where the additional notches are located, resulting in a reduced probability of signal detection.

Another known approach to resolving the problem of NTSC signal interference is to use an adaptive equalizer which forms notches which are then used to eliminate NTSC interference from the HDTV signal. Such a system can be both difficult and costly to implement.

Another known approach to the problem of NTSC signal interference uses spectral shaping of the HDTV signal to avoid all but the interference caused by the NTSC chrominance subcarrier. This approach fails to remove all of the NTSC signal interference from the HDTV signal and permits some of the chrominance subcarrier signal to remain causing interference with the HDTV signal. A further disadvantage of this approach is that it fails to make the most efficient usage of the available broadcast spectrum space.

In addition to the above approaches, forward error correction (FEC) encoding has also been used to combat NTSC signal interference. This approach, which attempts to correct errors resulting from NTSC signal interference, rather than to remove such interference from the received signal, has the drawback that it may not be possible to correct all the errors caused by the interference. Furthermore, the use of large amounts of FEC encoding fails, as with the case of spectral shaping to avoid NTSC signal interference, to make the most effective use of the available broadcast spectrum space.

The known approaches to NTSC signal cancellation can be difficult and costly to implement. Furthermore, several of the known systems fail to permit efficient use of the available broadcast spectrum space.

SUMMARY OF THE INVENTION

The present invention provides apparatus for removing NTSC signal interference from high definition television signals through the use of recursive filters. In accordance with one embodiment of the present invention, an NTSC signal interference canceler is designed using recursive digital filters to process the received television signal using real, as opposed to complex math. This "real" NTSC interference canceler may be used to reduce NTSC signal interference prior to mixing the signal down to baseband. In another embodiment, a "complex" recursive digital filter is used to process the received television signal using complex math. The use of a complex recursive digital filter results in a "complex" NTSC interference canceler which is particularly well suited for use in a baseband demodulator architecture. In a baseband demodulator architecture, two real NTSC cancelers could be used to independently filter the I- and Q- signals, however, spectral aliasing problems will exist in each quadrature signal path. Use of a complex recursive filter avoids this problem. Recursive digital filters are used to reduce NTSC signal interference after the signal is mixed down to baseband but prior to the demodulation.

In accordance with the complex NTSC interference canceler embodiment, a tuner receives television broadcast signals which may include an NTSC interference signal in addition to a desired HDTV signal. An I.F. signal is generated from the received television signals, including the NTSC interference signals. The I.F. signal is then mixed down to baseband using analog techniques by a complex signal consisting of cos ($\omega t$) and sin ($\omega t$) waveforms, to generate I- and Q- television signals. The I- and Q- television signals are converted from analog to digital signals through the use of an two analog to digital (A/D) converters.

The I- and Q- television signals which are output by the A/D converter may be supplied to the inputs of the complex NTSC signal interference canceler of the present invention. In this manner, the complex NTSC signal interference canceler of the present invention is supplied with both I- and Q- television signals which each include both the desired HDTV signal and the undesired NTSC interference signal. As described below, the complex NTSC interference canceler processes each of the I- and Q- television signals to reduce the NTSC interference and generate I- and Q- HDTV signals.

To eliminate the NTSC interference signal, while leaving the HDTV signal intact, in one exemplary embodiment of the present invention a first, a second and a third complex recursive filter is used to isolate the corresponding I- and Q- constituents of a first, second and third one of the three major components of an NTSC broadcast signal, i.e. the picture carrier, chrominance subcarrier and audio carrier signals, respectively. These three major components of an NTSC broadcast signal are responsible for the majority of NTSC signal interference. In the above context, the phrase, "picture carrier", is used to refer to the luminance carrier component of an NTSC broadcast signal.

After each one of the interference canceler's first through third complex filters isolates the corresponding one of the NTSC signal's major components, the isolated I- portion of each NTSC signal component is subtracted from the received I- television signal by a first adder and the isolated Q- portion of each NTSC signal component is subtracted from the received Q- television signal by a second adder. In this manner, the adders remove the NTSC signal interference from the received I- and Q-television signals to generate the I- and Q- HDTV output signals of the complex NTSC interference canceler of the present invention.

To provide for effective isolation of the NTSC signal components by the interference canceler's first, second and third complex filters, in one exemplary embodiment of the signal interference canceler of the present invention complex recursive notch filters with adjustable center frequencies are used. The center frequency of each one of the first, second and third complex filters is adjusted to match the frequency of its corresponding NTSC interference signal component. In this manner, frequency inaccuracies in the tuner's output may be compensated for by adjustment of the center frequency of each one of the first, second and third complex filters of the interference canceler of the present invention. The complex recursive notch filters may also have either fixed or adjustable gains depending on the particular embodiment. While complex recursive notch filters with adjustable gains provide for a high degree of NTSC interference cancellation and signal recovery, fixed gain recursive filters, requiring less circuitry to implement than adjustable gain filters, may also be used to provide NTSC cancellation.

In one embodiment of the present invention, the design of the interference canceler's first, second, and third complex filters is the same.

Each one of the first, second and third complex filters may comprise, e.g., a complex recursive filter circuit, a gain control circuit and a frequency control circuit. The complex recursive filter circuit of each complex interference canceler filter, has the I- and Q- received television signals, including the I- and Q- NTSC interference signals, as inputs.

Each complex recursive filter circuit, of the first, second and third interference complex canceler filters, places a notch at the center frequency of the corresponding NTSC interference signal component to be isolated. The center frequency of each notch is adjustable.

To insure cancellation of the I- and Q- NTSC interference signals at each of the interference canceler's adders, no phase shift should be induced onto the isolated I- and Q-NTSC signal components to be subtracted from the I- and Q- received television signals. In accordance with the present invention, at the center frequency of each complex recursive filter circuit's notch, the phase shift is approximately zero. However, phase shift will occur at frequencies other than the recursive filter's center frequency. Thus, to avoid phase shift, each complex recursive filter circuit should pass the I- and Q-constituents of the NTSC signal component to be isolated at its center frequency.

In accordance with the present invention, the center frequency of each complex recursive filter circuit's notch is adjusted to pass the NTSC signal component to be isolated at the filter's center frequency. In one embodiment, a single frequency control circuit is used to adjust the center frequency of the first, second and third complex recursive filter circuits. In another embodiment, a separate frequency control circuit is used to independently control the center frequency of the notches produced by each of the first, second and third complex recursive filter circuits.

Thus, the NTSC signal interference canceler of the present invention accurately adjusts the placement of each one of the interference canceler's notches to correspond to the frequency of each one of the NTSC signal components. Accordingly, the apparatus of the present invention compensates for frequency inaccuracies in the television signal induced by, e.g., the tuner.

In addition to adaptive adjustment of the center frequency of each of the first, second and third complex filters of the interference canceler, the gain of each one of the first, second or third complex filters may be independently adjusted to optimize NTSC signal interference cancellation. Alternatively, the gain of each one of the first, second, and third complex recursive filter circuits may be fixed at a value determined to be indicative of the anticipated NTSC energy distribution of the NTSC interference signal. In still yet other embodiments, various combinations of complex recursive filter circuits with fixed gains and recursive filter circuits with adjustable gains may be used to implement the complex NTSC canceler of the present invention.

In one embodiment of the present invention, the gain control circuit of each one of the first, second, and third complex filters independently adjusts the gain of each complex filter as a function of an estimate of the power of the signal of interest, i.e. the HDTV signal, at the recursive filter's center frequency, $\omega_c$, and an estimate of the power of the signal of interest plus the power of the NTSC interference signal, at $\omega_c$.

To estimate the power of the HDTV signal at $\omega_c$, a measurement of the received television signal's power is made at a frequency where the NTSC signal power is at a minimum. Since HDTV signal power is expected to be relatively constant throughout the HDTV signal's broadcast spectrum, this value may then be used as an estimate of the HDTV signal power at $\omega_c$ for purposes of calculating the gain of any one of the first, second or third complex filters.

Thus, in accordance with one embodiment of the present invention, the gain of each of the first, second and third complex filters is adjusted as a function of the estimated power levels to isolate the I- and Q- NTSC interference signal components, for subtraction from the received I- and Q- television signals, by the adders of the NTSC signal interference canceler of the present invention.

In such an embodiment, the independent adjustable gain of each one of the complex filters of the NTSC interference canceler of the present invention permits the gain of each complex filter to be adjusted so that the NTSC interference canceler of the present invention removes the NTSC interference while leaving the HDTV signal intact.

Since it is desirable to isolate only the NTSC interference signal components, for subtraction from the received television signal, the bandwidth of the first, second and third complex filters of the NTSC signal interference canceler of the present invention should be made sufficiently narrow to pass only the NTSC signal interference. However, if such narrow filters are not possible due to the numerical precision required to implement such complex filters, wider filter bandwidths may be used at the risk of attenuating some of the HDTV signal.

While the use of three recursive complex notch filter circuits, i.e., one filter circuit being used to isolate each one of the three major components of an NTSC broadcast signal, provides a useful degree of NTSC interference cancellation, in one embodiment of the present invention additional complex recursive notch filters are used to remove NTSC signal components not removed by the three complex recursive notch filter circuits used to isolate the three major components of an NTSC broadcast signal. For example, in one embodiment, additional complex notch filters are centered about the picture carrier spaced approximately 15,734 Hz apart to isolate components of the NTSC picture carrier signal not isolated by the picture carrier filter circuit centered at the picture carrier's center frequency. By using such additional filters, improved NTSC signal cancellation and detection probability is achieved as compared to embodiments using fewer filters.

In order to reduce costs in particular applications, where only particular components of the NTSC signal are causing interference problems or are expected to cause interference problems, the apparatus of the present invention may be simplified to include complex recursive filters to remove only the NTSC signal components causing the interference problem and not all three of the NTSC signal's major components.

In yet other embodiments of the NTSC interference canceler of the present invention, the NTSC interference canceler comprises one or more recursive digital notch filters with fixed center frequencies. In such embodiments, a frequency error correction signal is generated by one or more of the recursive digital notch filters and supplied to, e.g., the tuner which can then adjust the frequency of the received television signal to insure that one or more of the NTSC interference signal components are located at the center frequency of a corresponding notch filter.

Such an embodiment has the advantage of permitting the notch filters to be implemented using mostly fixed weight elements as opposed to adjustable weight elements that would otherwise have to be used to implement notch filters with an adjustable center frequencies.

The NTSC signal interference canceler of the present invention has the advantage of working with any of the currently proposed HDTV broadcast standards since the cancellation method used works in a manner that is independent of the type of HDTV signal involved. Furthermore, it is relatively easy to implement while providing a high degree of NTSC signal cancellation.

DETAILED DESCRIPTION

Figure 1:
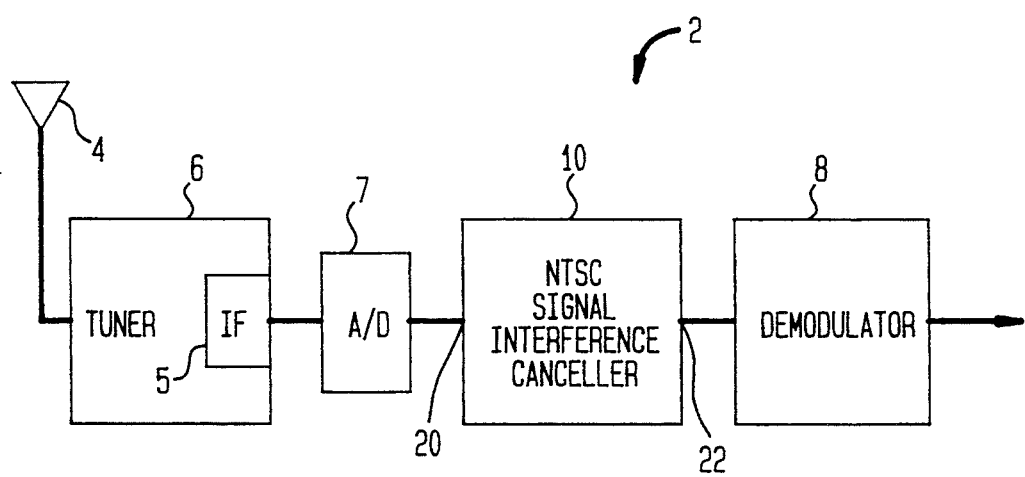
FIG. 1 is a schematic block diagram of an antenna through demodulator portion of a receiver, incorporating a real NTSC signal canceler in accordance with one embodiment of the present invention.

Referring now to the drawings, and initially to FIG. 1, there is illustrated a television receiver according to one exemplary embodiment of the present invention, generally indicated by the reference numeral 2. The television receiver 2 comprises an antenna 4, a tuner 6, an analog to digital (A/D) converter 7, a real NTSC signal interference canceler 10 and a demodulator 8.

The output of the antenna 4 is coupled to the input of the tuner 6. The tuner 6 may comprise, e.g., an intermediate frequency (IF) stage 5 which couples the signal input of the tuner 6 to a tuner output. The output of the tuner 6 is coupled to an input of the A/D converter 7. The output of the A/D converter is coupled to an input 20 of the real NTSC signal interference canceler 10 of the present invention. In this manner, the real NTSC signal canceler 10 is supplied with the received HDTV broadcast signal and the NTSC interference signal via the antenna 4, tuner 6 and A/D converter 7.

The interference canceler 10 of the present invention has an output 22 coupled to the demodulator 8. The demodulator 8, in turns has a signal output for coupling to the next stage of the receiver's circuitry (not illustrated).

Figure 2:
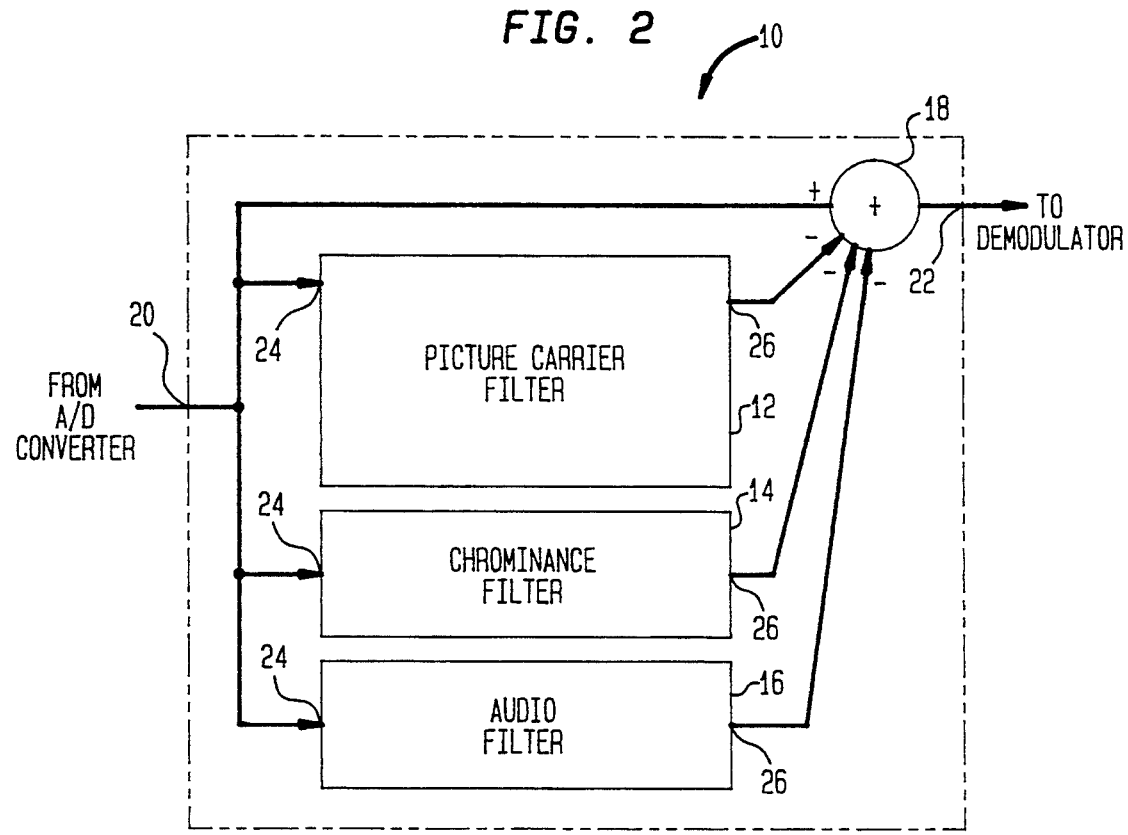
FIG. 2 is a block diagram of a real NTSC signal interference canceler according to the present invention.

FIG. 2 illustrates a schematic block diagram of an exemplary embodiment of a real NTSC signal interference canceler which may be used as the interference canceler 10, illustrated in FIG. 1.

The real NTSC signal canceler 10 comprises a first, second and third filter 12, 14, 16 which process the received television signal using real, as opposed to complex, math and an adder 18. The signal input 20 of the signal canceler 10 is coupled to a corresponding signal input 24 of each one of the first second and third filters 12, 14, 16 and to an adder input of the adder 18.

The first, second and third filters 12, 14, 16 each have a filter signal output 26. Each one of the filter signal outputs 26 is coupled to a corresponding one of a first, second and third subtractor input of the adder 18, respectively. The adder 18, in turn, has an HDTV signal output which is coupled to the corresponding HDTV signal output 22 of the NTSC signal interference canceler 10 of the present invention.

The first, second and third filters 12, 14, 16 may contain the same or similar filter circuitry and thus may be interchangeable. However, while the three filters 12, 14, 16 contain the same circuitry, each one of the filters 12, 14, 16 has a different gain and center frequency selected to correspond to the particular NTSC signal component the filter 12, 14, or 16 is designed to isolate.

Figure 6:
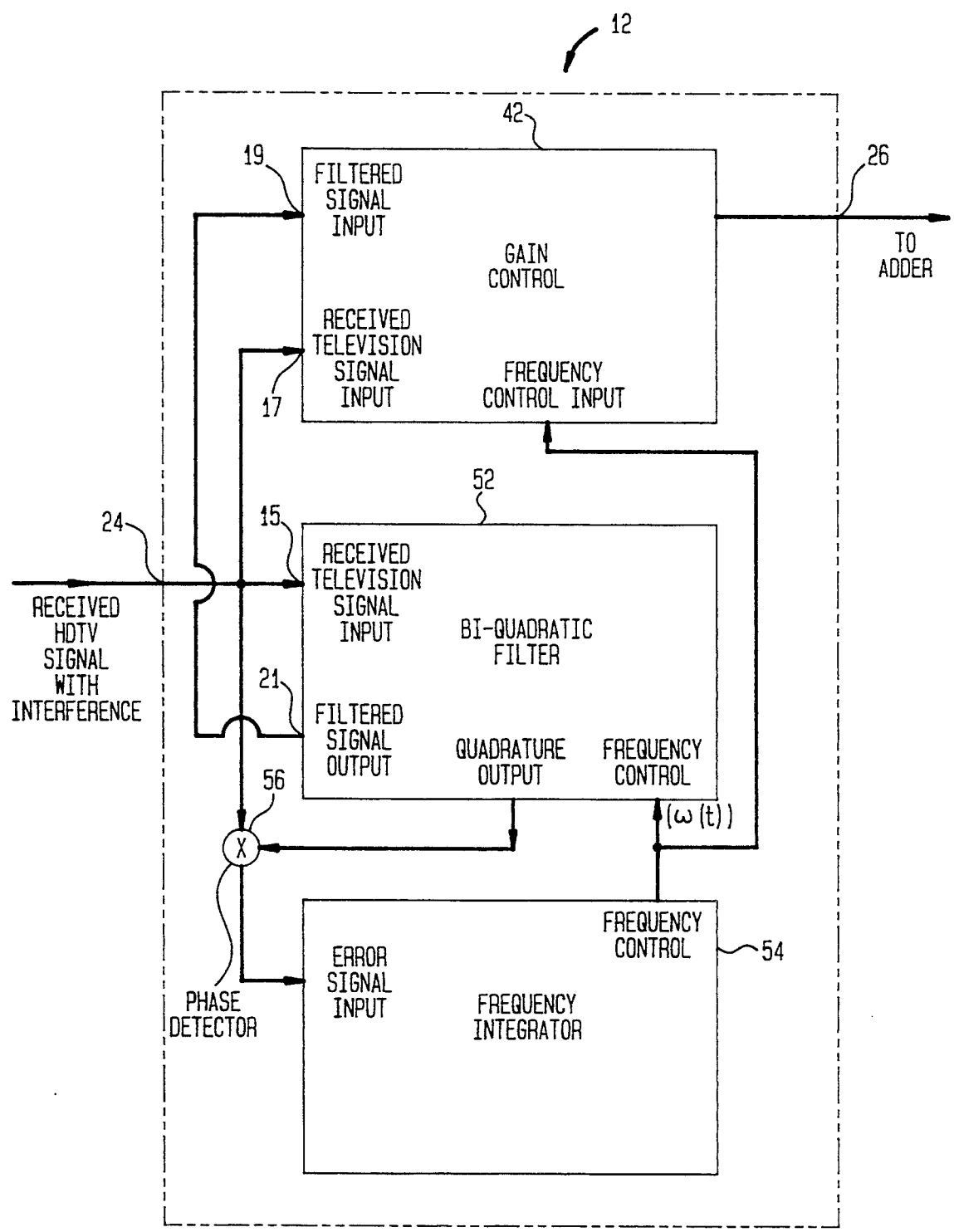
FIG. 6 is a block diagram of a circuit which may be used, in an exemplary embodiment of the present invention, as any one of the filters of the NTSC signal interference canceler illustrated in FIGS. 1 and 2.

Referring briefly to FIG. 6, in one embodiment of the real NTSC interference canceler of the present invention, each one of the filters 12, 14, 16 comprises a gain control circuit 42, a recursive filter circuit 52 and a center frequency control circuit comprising a frequency integrator circuit 54 and phase detector 56. In various embodiments of the gain control circuit 42, the gain of each filter 12, 14, 16 may be dynamically adjusted or, alternatively, the gain control circuit 42 may comprise a fixed gain element with a gain that corresponds to the expected NTSC interference level. The gain control circuit 42 may also comprise a means for detecting the presence of NTSC interference and a means for disconnecting the filter when no interference is detected.

In accordance with one embodiment of the present invention, one or more of the filters 12, 14, 16 includes a frequency control circuit including a phase detector 56 and a frequency integrator 54 for adjusting the center frequency of the filters 12, 14, and/or 16. Accordingly, in the embodiment illustrated in FIG. 6, the filter 12 comprises a frequency control circuit for adjusting the center frequency of the individual filter 12.

Alternatively, because all NTSC signal components are frequency related, a single frequency control circuit may be used with all filters 12, 14, 16. When a single frequency control circuit is used, the center frequency of all the filters 12, 14, 16 are adjusted in unison. In accordance with such an embodiment, the frequency control circuit illustrated in FIG. 6 as part of the filter 12 may be used to control the center frequency of all the filters 12, 14, 16 avoiding the need for a frequency control circuit in the other filters 14 and 16. Since the signal to noise ratio is expected to be highest at the center frequency of the picture carrier component of the NTSC signal, it is desirable to include the frequency control circuit with the picture carrier filter 12 and have the center frequency of the other filters 14, 16 slave tuned to the frequency control circuit of the picture carrier filter 12.

Thus, the center frequency and/or gain of each one of the filters 12, 14, 16 can be adjusted to isolate a different component of the NTSC signal for enhanced overall NTSC signal cancellation.

The majority of NTSC signal interference will be caused by the NTSC signal's three major components, i.e., the picture carrier, chrominance subcarrier and audio carrier. Accordingly, each one of the NTSC signal interference canceler filters 12, 14, 16 are adjusted to isolate a different one of the NTSC signal's major components.

As shown in FIG. 2, the first filter 12 may be adjusted to isolate the NTSC picture carrier while the second and third filters 14, 16 may be adjusted to isolate the NTSC chrominance subcarrier and audio carrier, respectively. Once these signals are isolated, they may then be subtracted from the input signal by the adder 18.

In the above manner, the NTSC signal interference canceler 10 acts as a filters placing an adjustable notch at each of the three NTSC major component's frequencies. Each one of these adjustable notches is generated by a different one of the three filters 12, 14, 16.

Figure 3:
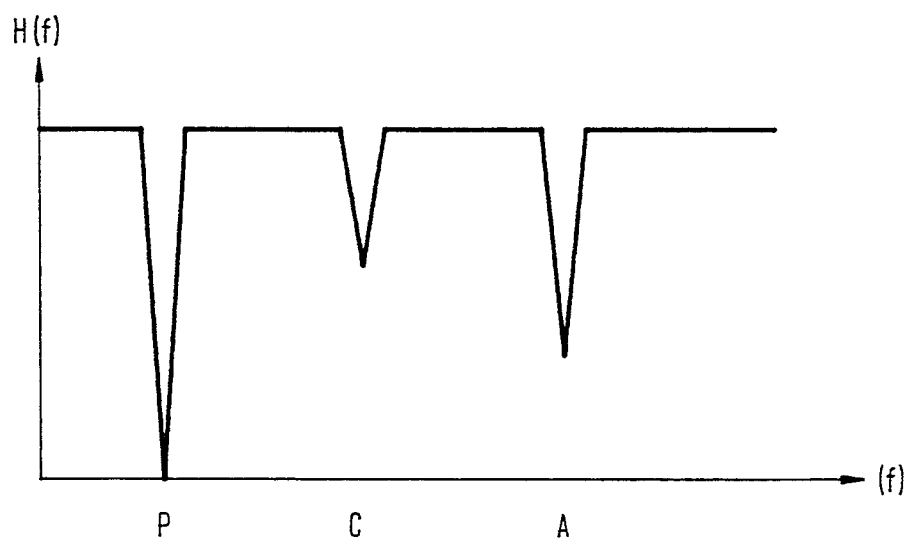
FIG. 3 illustrates the overall frequency response of the NTSC signal interference canceler of FIGS. 1 and 2.

A diagram of the overall transfer function, H(f), of the real NTSC signal interference canceler 10 of the present invention is illustrated in FIG. 3. Referring now to FIG. 3, it can be seen that the interference canceler 10 places a notch at the carrier frequency (P, C, A) of each one of the picture carrier, chrominance subcarrier, and audio carrier components of an NTSC signal, respectively. In this manner, the interference from the NTSC signal is removed by the interference canceler 10 from the input signal. The gain of the filters 12, 14, 16 and thus the depth of each one of the notches illustrated in FIG. 3, is selected, in one embodiment, to be a fixed value corresponding to the anticipated power level of the interference signal. In another embodiment, the gain of one or more of the filters 12, 14, 16 is adjusted depending on the strength of the particular NTSC interference signal component to be isolated by the filters 12, 14, 16.

To enhance NTSC interference cancellation and signal recovery, the characteristics of the overall transfer function, H(f), associated with the interference canceler 10, illustrated in FIG. 3, should be optimized through the adjustment of the gain and center frequency of each one of the three filters 12, 14, 16, to provide the highest possible probability of detection of the HDTV signal.

According to detection probability theory, the highest probability of detection of a signal which contains noise is achieved when the signal is present in white noise and a matched filter is used. Thus, if the noise which is received with the desired HDTV signal is colored, e.g. by the presence of an NTSC signal, it should first be whitened by the use of a whitening filter before being supplied to the demodulator 8. It is possible to combine the function of the matched filter, modified to the whitened noise, into the whitening filter and arrive at what is referred to as a whitening-whitening conjugate filter.

Whitening-whitening conjugate filters attenuate the interference signal not to the noise level, but to a level as far below the HDTV plus noise level as the interferer's level was above the HDTV plus noise level. Such filters allow for a higher probability of signal detection. For this reason, one embodiment of the NTSC signal interference canceler 10 of the present invention is designed as a whitening-whitening conjugate filter.

To construct the interference canceler 10 as a whitening-whitening conjugate filter, each of the filters 12, 14, 16, are required to have a phase response that is zero at the frequency of the interference signal component to be removed.

Since tuner outputs have frequency uncertainties, the filters 12, 14, 16 of the present invention should be able to adapt in their center frequency. To reduce the cost and complexity of the filters 12, 14, 16 used in the interference canceler 10, the filters 12, 14, 16 are implemented using a recursive filtering technique which uses an infinite impulse response (IIR) filter.

Figure 4:
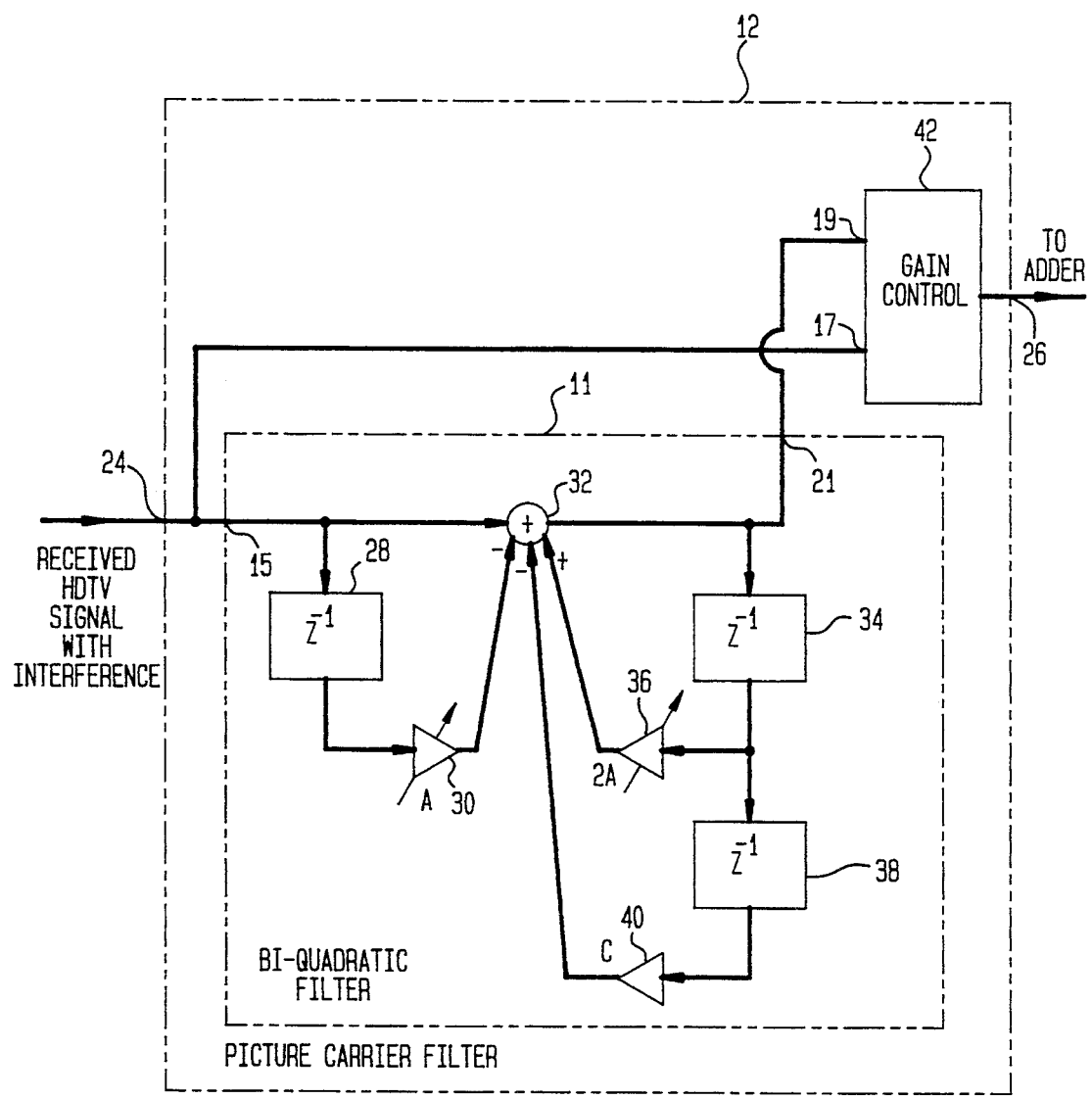
FIG. 4 is a block diagram of a filter circuit which may be used as any one of the filters of the NTSC signal interference canceler illustrated in FIGS. 1 and 2.

Referring now to FIG. 4, there is illustrated a simplified schematic block diagram of the picture carrier filter 12 with an adjustable gain element. The filter 12 comprises the bi-quadratic filter circuit 11 and the gain control circuit 42.

As noted above, all the filters 12, 14, 16 may contain the same circuitry. Thus, the circuit used to implement the filter 12 could be used to implement any one of the filters 12, 14, 16 of FIG. 2. A frequency control circuit may be added to the filter 12, as will be described below to adaptively adjust the center frequency of the filter 12. The picture carrier filter 12 will only be explained since the other two filters 14, 16 are functionally identical.

The bi-quadratic filter circuit 11 comprises an adder 32, and first, second and third first order unit delay elements 28, 34, 38, respectively. The bi-quadratic filter circuit 11 further comprises first and second variable weight elements 30, 36 and a constant weight element 40.

Unit delay elements 28, 34, and 38 are well known in the field of digital signal processing. Such unit delay elements delay the signal received at the delay element's input, for a predetermined number of unit time periods before the signal is supplied to the unit delay element's output. The number of time periods the unit delay element delays the signal is determined by the order of the delay element. For example, a first order unit delay element, sometimes represented as $Z^{-1}$, delays a received signal one unit time period before supplying the signal to the unit delay element's output.

Referring again to the filter circuit 12, the received television signal input 24 of the filter 12 is coupled to a received television signal input 15 of the bi-quadratic filter 11 and to a received television signal input 17 of the gain control circuit 42. Thus, both the gain control circuit 42 and the bi-quadratic filter 11 have the received television signal, which contains both the HDTV signal and the NTSC interference signal, as an input.

The received television signal input 15 of the bi-quadratic filter circuit 11 is coupled to a summing input of the adder 32 and to an input of the first unit delay element 28. The output of the first unit delay element 28 is coupled to the input of the first variable weight element 30 which, in turn, has its output coupled to a subtractor input of the adder 32.

The adder 32 has an output which is coupled to a filtered signal output 21 of the bi-quadratic filter 11 and to the input of the second unit delay element 34. The output of the second unit delay element 34 is coupled to the input of the second variable weight element 36 and to the input of the third unit delay element 38. The output of the second variable weight element 36 is coupled to a summing input of the adder 32.

The third unit delay element 38 has its output coupled to the input of the constant weight element 40 which, in turn, has its output coupled to a subtractor input of the adder 32.

The filtered signal output 21 of the bi-quadratic filter circuit 11 is coupled to the filtered signal input 19 of the gain control circuit 42. An NTSC interference signal output of the gain control circuit 42 is coupled to the output 26 of the filter 12. Thus, the amplitude of the NTSC interference signal, which is output by the filter 12 and which is to be subtracted from the received signal, is controlled by the weight, G, of the gain control circuit 42.

The weight elements 30, 36, 40 and the gain control circuit 42 have various weight or multiplier factors which can be represented by the symbols A, G and C. In the filter circuit 11, the first variable weight element 30 has a weight of A while the second variable weight element 36 has a weight of 2A, where A=alpha*cos($\omega$(t)) and where alpha is a real number.

The gain control circuit 42 has a weight of G, where G is used, as described above, to control the overall gain of the filter 12. The constant weight element 40 has a weight of C, where C=alpha*alpha.

The overall task of the filter 12, like the other filters 14, 16, is to place an adjustable notch, having an adjustable center frequency and/or gain, at the carrier frequency of the NTSC signal of interest, i.e., for this example, the picture carrier signal.

The filter circuit 11 and thus the filter 12 becomes a high Q resonant circuit at the center frequency $\omega_c$. The passband shape, i.e. the width of the filter notch, is controlled by alpha where alpha determines the distance from the unit circle at which the complex poles of the Z transform representation of the filter circuit 11 are placed. The center frequency of the filter circuit 11 is determined by the angular placement of the complex poles of the filter circuit 11. This is determined by the value of $\omega_c$ in radians/sample.

The center frequency of each filter notch is controlled by weights A and 2A and the depth of each notch by G. The output of the filter 12 must be in-phase with the input interference signal component if it is to cancel at the final output summing circuit, i.e. the adder 18. The weight G will control the amount of attenuation. This weight, G, may be adjusted based on the received television signal power level and the HDTV signal power level, as will be described below. Alternatively, a fixed weight G may be used to control the attenuation. When a fixed weight G is used, it is selected so that it approximates the expected energy level of the interfering NTSC signal component, i.e., the picture carrier signal in this example. When a fixed weight G is used, a connect/disconnect circuit is included in the gain control circuit 42 for disconnecting the filter when no NTSC interference is present.

The basic structure of the filter circuit 11, and thus the filter 12, is referred to as a bi-quadratic recursive digital filter. The difference equation for the filter circuit 11 is as follows:

$$y(n)=2A^*y(n-1)-C^*y(n-2)+x(n)-A^*x(n-1) \quad (1)$$

The Z transform of the transfer function of the filter 12 is:

$$\frac{Y(Z)}{X(Z)} = \frac{1 - AZ^{-1}}{1 - 2AZ^{-1} + CZ^{-2}}$$

if
A=alpha*cos ($\omega$(t)) and,
C=alpha*alpha.

Figure 5:
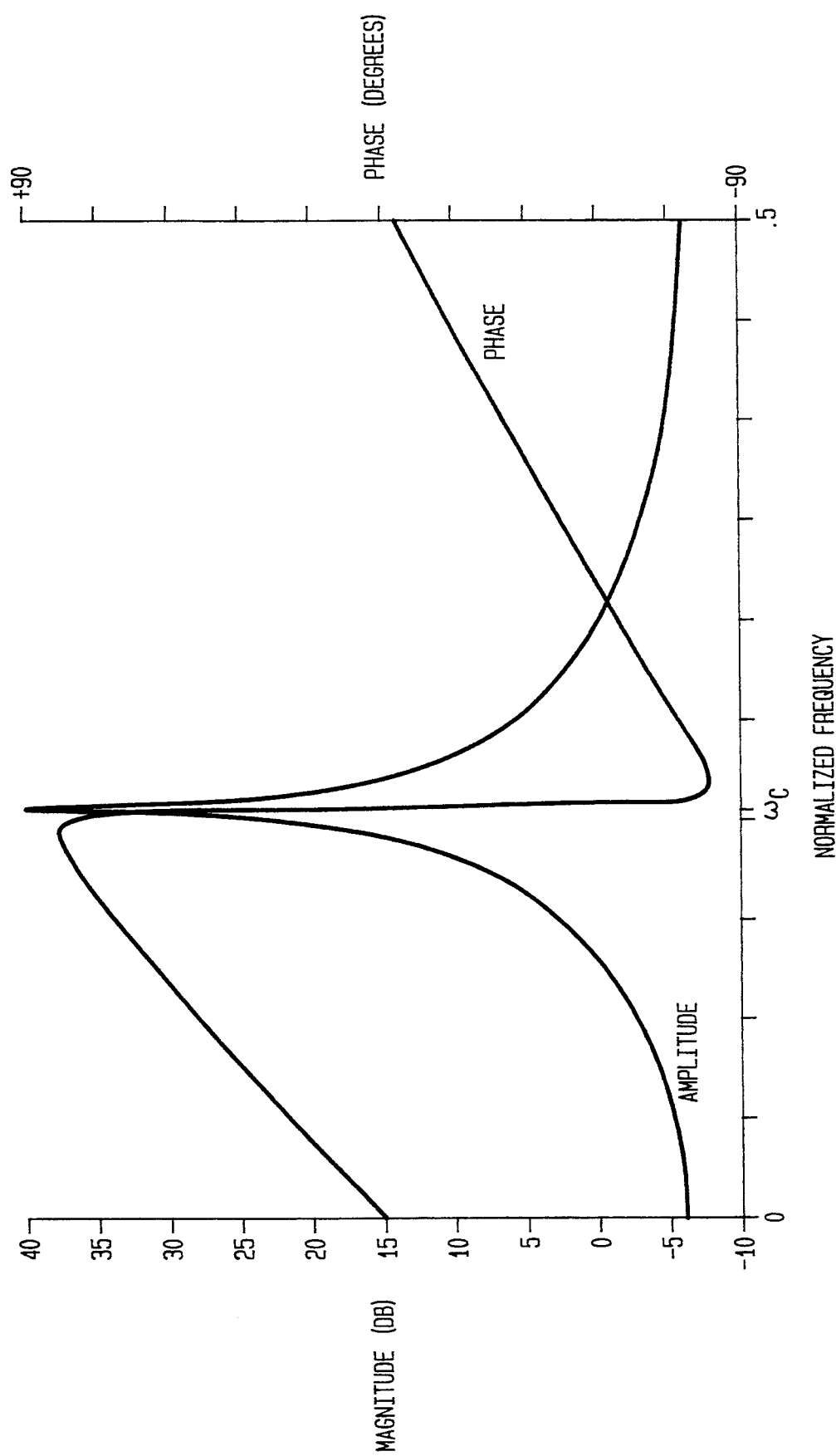
FIG. 5 is a diagram illustrating the amplitude and phase response characteristics of the filter illustrated in FIG. 4.

The amplitude and phase response of the filter circuit 11, and thus the filter 12, is shown in FIG. 5. The phase response at the filter's center frequency, $\omega_c$, is zero. This phase response is required to permit the coherent subtraction of the NTSC interference signal from the received television signal to leave the HDTV signal of interest. The overall gain of the filter 12 and hence the depth of the notch created by the filter 12 is determined by the gain, G.

Referring again to FIG. 3, the typical overall amplitude response of the NTSC signal interference canceler 10 is shown. Each one of the filters 12, 14, 16 is responsible for a corresponding one of the notches shown. The depths of each notch, controlled by each filter's individual gain, G, reflects the relative strength of each expected interfering NTSC signal component.

To insure cancellation of the NTSC interference signal, each filter 12, 14, 16 is required to pass each NTSC interference signal component at the filter's center frequency. This insures that no phase shift is induced onto the isolated NTSC interference signal component which is used for subtraction.

If the tuner's I.F. output has frequency inaccuracies, as is likely, the NTSC signal's components are not likely to fall at the expected frequency and thus may not fall in the center of each bi-quadratic filter 12, 14, 16.

This problem of frequency error, which may be caused by the tuner 6, is solved in the NTSC signal interference canceler 10 by adjusting each of the filter's 12, 14, 16 center frequencies, as will be described below. This is done by adjusting the weights used to control each filter's center frequency.

Referring now to FIG. 6, there is illustrated a schematic block diagram of a filter circuit 12 which may be used, in an exemplary embodiment of the present invention, as the picture carrier filter 12 of the NTSC signal interference canceler 10. The design of the filter 12 may be used to implement either of the other two filter circuits 14, 16 as well.

The filter circuit 12 of FIG. 6 comprises a gain control circuit 42, a bi-quadratic filter 52, and a frequency control circuit comprising the center frequency integrator circuit 54 and the phase detector 56.

The received television signal input 24 of the filter 12 is coupled to a received television signal input 15 of the bi-quadratic filter 52, a received television signal input 17 of the gain control circuit 42 and to a received television signal input of the phase detector 56. A quadrature component signal output of the bi-quadratic filter 52 is coupled to a quadrature component signal input of the phase detector 56.

The output of the phase detector 56 is, in turn, coupled to an error signal input of the frequency integrator 54. The frequency integrator 54 has a frequency control signal output coupled to a frequency control signal input of the bi-quadratic filter 52 and to a frequency control signal input of the gain control circuit 42.

A filtered signal output 21 of the bi-quadratic filter 52 is coupled to a filtered signal input 19 of the gain control circuit 42. The NTSC component signal output of the gain control circuit 42 is coupled to the output 26 of the filter 12.

Figure 7A:
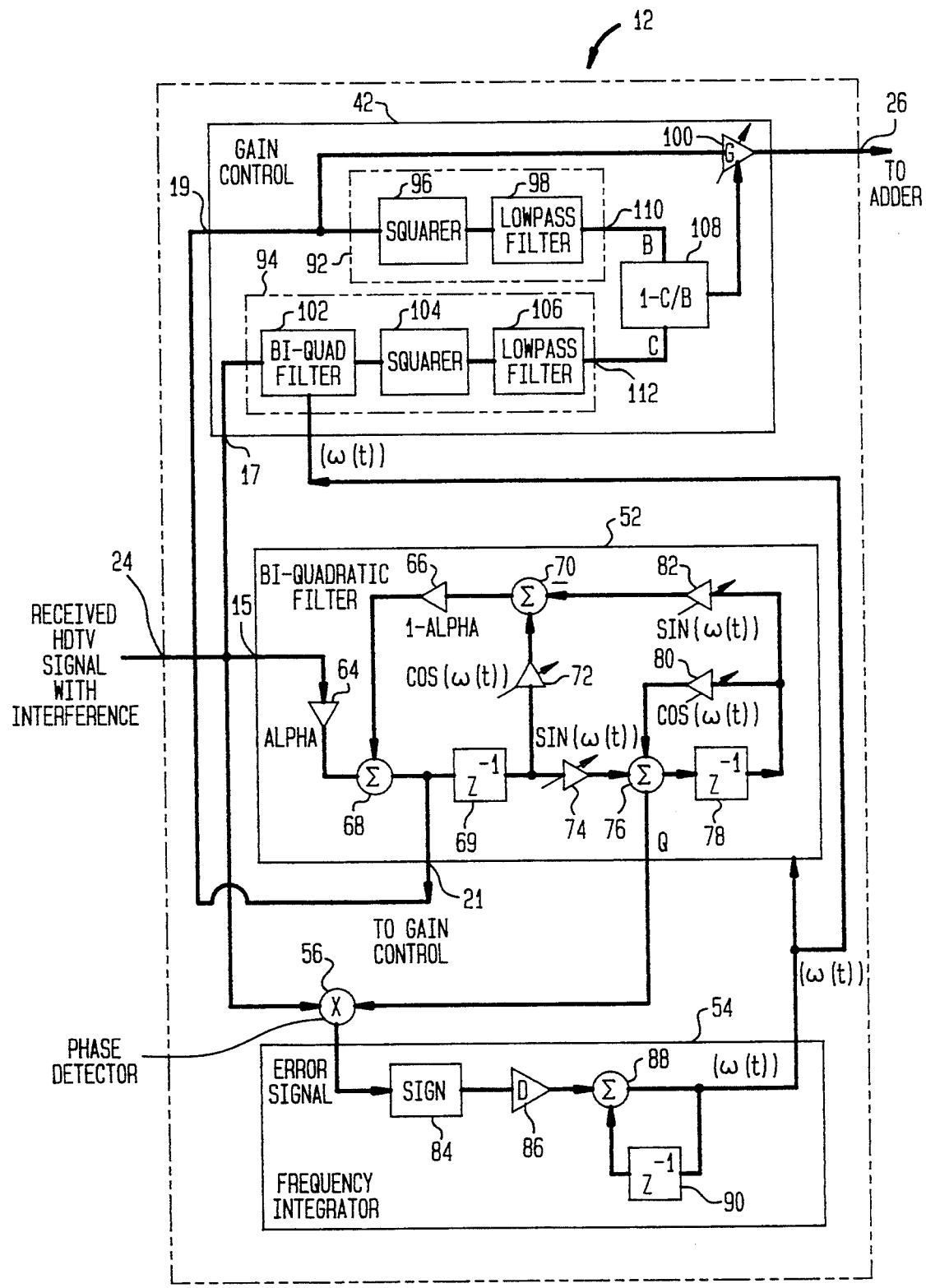
FIG. 7a is a more detailed schematic diagram of one embodiment of the circuit illustrated in FIG. 6 including an adjustable gain element.

Referring now to FIG. 7a, one embodiment of the filter 12 of FIG. 6, with an adjustable gain, is illustrated in greater detail. In FIG. 7a, like numbered elements as those contained in FIG. 6 are coupled together in the same manner as described above in regard to FIG. 6.

As illustrated in FIG. 7a, the bi-quadratic filter 52 comprises a first constant weight element 64 which has an input coupled to the received television signal input 15 of the bi-quadratic filter 52. The first constant weight element 64, which has a weight of alpha, has its output coupled to a first input of a first adder 68. The adder 68 has a second input which is coupled to the output of a second constant weight element 66, which has a weight of 1−alpha.

The adder 68 has an output coupled to a first unit delay element 69 and to the filtered signal output 21 of the bi-quadratic filter 52. The first unit delay element 69 in turn has its output coupled to the inputs of first and second variable weight elements 74, 72. The first variable weight element 74 has a weight of sin ($\omega$(t)), while the second variable weight element 72 has a weight of cos ($\omega$(t)).

The output of the first variable weight element 74 is coupled to a first input of a second adder 76. A second input of the second adder 76 is coupled to the output of a third variable weight element 80 which has a weight of cos ($\omega(t)$).

The second adder 76 has a first and second output. The first output is coupled to the input of a second unit delay element 78. The second output of the second adder 76 is coupled to the quadrature component signal output of the bi-quadratic filter 52.

The second unit delay element 78 has its output coupled to an input of the third variable weight element 80 and to an input of a fourth variable weight element 82. The output of the fourth variable weight element 82, which has a weight of sin ($\omega(t)$), is coupled to a first input of a third adder 70. The third adder 70 has a second input coupled to the output of the second variable weight element 72. An output of the third adder 70 is coupled to the input of the second constant weight element 66.

As described above, the output of the second constant weight element 66 is coupled to the second input of the adder 68 which generates the filtered signal output of the bi-quadratic filter 52.

Figure 7B:
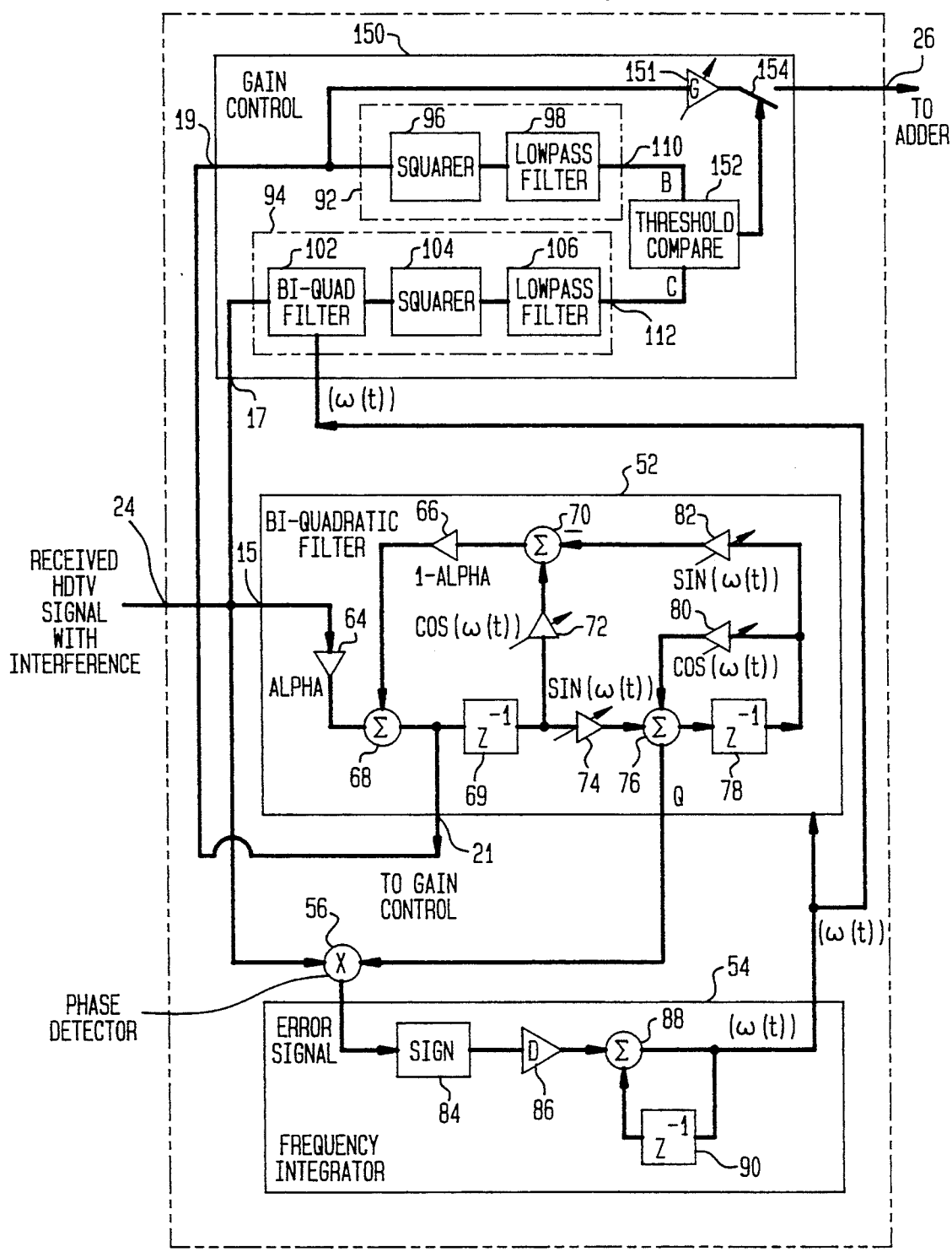
FIG. 7b is a more detailed schematic diagram of one embodiment of the circuit illustrated in FIG. 6 including a fixed gain element.
Figure 8:
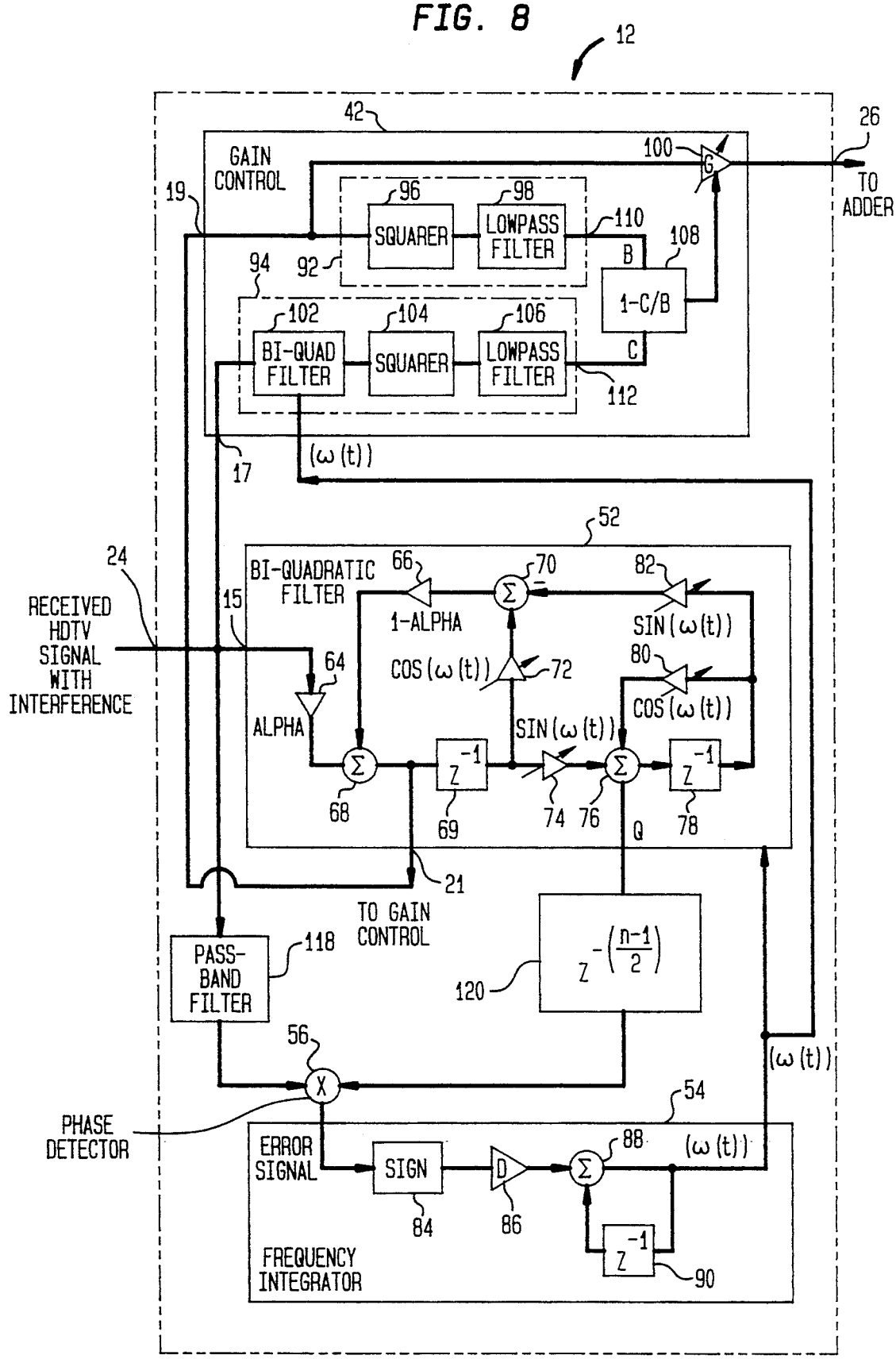
FIG. 8 is an alternative embodiment of a circuit which may serve as any one of the filters of the NTSC signal canceler of the present invention illustrated in FIG. 1.

The bi-quadratic filter 52 of FIGS. 7a, 7b, and 8 are similar to the bi-quadratic filter 11, shown in FIG. 4, with the additional circuitry added to allow for a quadrature component signal output. The bi-quadratic filter 52 of FIGS. 6 and 7 and the bi-quadratic filter 11 of FIG. 4 have the same amplitude and phase response characteristics. The amplitude and response characteristics are illustrated in FIG. 5 for the bi-quadratic filter 11 of FIG. 4 with an alpha equal to 0.995 and for the bi-quadratic filter 52 of FIGS. 7, 8, and 9 with an alpha equal to 0.005.

The bi-quadratic filter 52 performs a transfer function between its input and its filtered signal output which has the following Z transform representation:

$$\frac{Y(Z)}{X(Z)} = \frac{A_n + B_n Z^{-1}}{A_d + B_d Z^{-1} + Z^{-2}}$$

where,
$A_n$ = alpha / (1−alpha),
$B_n$ = −alpha*cos($\omega(t)$) / (1−alpha),
$A_d$ = 1 / (1−alpha), and
$B_d$ = −(2−alpha)*cos ($\omega(t)$) / (1−alpha)

and where alpha is a real number which controls the distance from the unit circle at which the complex poles of the Z transform representation of the filter circuit 52 are placed.

Initially, i.e., during the signal acquisition phase of filter operation, the center frequency of the bi-quadratic filter 52 is set to the expected frequency of the NTSC signal component to be isolated, e.g., the frequency of the picture carrier signal. The filter's center frequency is then adjusted, as will be described below, so that the filter's center frequency $\omega_c$ corresponds to the actual frequency of the NTSC signal component to be isolated.

For purposes of implementing the NTSC interference canceler 10, it is assumed that the tuner induced and other frequency inaccuracies will be small enough such that the major NTSC interference signal components will always fall within the passband of each filter 12, 14, 16. Such an assumption is reasonable given current tuner frequency inaccuracies and the expected bandwidth of the filters 12, 14, 16.

While the passband widths of the filters 12, 14, 16 can be made arbitrarily wide, unnecessarily wide passband widths have the drawback of possibly removing some of the HDTV signal along with the NTSC interference signal. For this reason, the passband width of the filters 12, 14, 16 should be made wide enough to remove the NTSC signal interference but narrow enough that no substantial attenuation of the HDTV signal occurs.

When the notch filters 12, 14, 16 are implemented using narrow passband widths, a portion of the NTSC interference signal may not be removed by the filters 12, 14, 16 because portions of the NTSC interference signal may fall outside the passband of the filters 12, 14, 16. In such a case, additional notch filters may be centered around the center frequency of the NTSC interference signal components at the component's sideband lines. For example, in one embodiment, a pair of notch filters is centered about the NTSC picture carrier signal component, spaced approximately 15.734 KHz apart so that the additional filters are located at the center of the sideband lines of the picture carrier signal. Each additional pair of notch filters centered about the picture carrier signal has been found to improve detection probability by approximately 1 dB. Thus, the use of such additional notch filters provides an effective means of improving the performance of the real NTSC interference canceler 10 of the present invention.

The use of additional notch filters centered about the major NTSC interference signal components should improve the performance of the NTSC interference canceler 10 until the amount of inter-symbol interference caused by the notch filters is the dominant source of quadrature amplitude modulation ("QAM") signal distortion.

In accordance with the filter design illustrated in FIG. 7a, once an NTSC interference signal component is in the passband of the filter circuit 52, the output signal's frequency is the same as the input signal's frequency and the filter 12 only has to adjust its center frequency to achieve phase lock. This adjustment is the function of the phase detector 56 and the frequency integrator 54.

The frequency integrator 54, illustrated in FIG. 7a, comprises a sign detection block 84, a constant weight element 86 with a weight of B, an adder 88 and a unit delay element 90.

The output of the phase detector 56 is coupled to the error signal input of the frequency integrator 54. The error signal input of frequency integrator 54 is, in turn, coupled to the input of the sign detection block 84.

As illustrated in FIG. 5, the phase slope in the passband of the filter circuit 52 and thus the filter 12 is essentially linear. This feature of the filter circuit 52 is used by the phase detector 56 to generate an error signal which is used to control the center frequency of the bi-quadratic filter 52.

Standard phase lock techniques are used by the phase detector 56 to cross correlate the received television input signal with the quadrature component signal which is output by the bi-quadratic filter 52. At phase lock, the correlation of quadrature waveforms averages to zero. Any phase offset will result in a non-zero error signal being generated by the phase detector 56.

The integrator 54 receives and measures the error signal output by the phase detector 56. If the filter 52 is centered with the incoming NTSC waveform contained in the received television signal, the cross correlation of the input signal with the quadrature component signal is zero. If the filter circuit 52 is not centered, an error signal is generated and averaged by the integrator 54.

The integrator's output is then used to adjust the filter's weight, ($\omega$(t)), such that the filter circuit 52, and thus the filter 12, centers itself about the frequency of the NTSC interference signal component which is to be isolated.

To allow for easy hardware implementation of the integrator 54, the sign of the error signal supplied to the integrator 54 is taken by the sign detector 84. The sign is then used to move the filter weights in a fixed step size up or down in frequency, depending on the sign of the error signal received. This step size, D, determined by the fixed weight of the constant weight element 86 illustrated in FIG. 7a, should be relatively small so that noise will not be able to move the center frequency of the filter circuit 52 in a large direction either up or down in frequency.

When the center frequency of the filter circuit 52 is not properly centered about the NTSC interference signal components frequency, the output of the sign detector 86 will hold mostly positive or negative, with fluctuations in the detected sign of the error signal being caused by the input television signal's noise component, including the received NTSC signal noise.

However, once phase lock has been achieved, and the center frequency of the filter circuit 52 matches the frequency of the NTSC interference signal component to be isolated, the output of the sign detector 84 will fluctuate equally in both the positive and negative directions. Such alternating fluctuations cannot coherently build a bias at the output of the adder 88 and thus the output of the integrator 54. Accordingly, once phase lock has been achieved, the center frequency of the filter circuit 52 and, thus, the center frequency of the filter 12 will remain fixed.

Similarly, if interference drop-out occurs, i.e. the NTSC interference signal is lost or fades for some reason, the center frequency of each filter 12, 14, 16, will not be changed. Without the NTSC interference signal, only random noise will remain. Such random noise cannot coherently build a bias on the integrator 54 because of the relatively even fluctuations in the output of the sign detector 84, caused by the random noise. Thus, during NTSC signal interference fades, the gain control circuit 42 will continue to adjust the gain of the filter 12; however, the center frequency will remain fixed as long as the NTSC signal fade lasts.

Since the center frequency of the filter 12 remains unchanged during interference signal fades, easy reacquisition of the NTSC interfering signal is possible after a signal fade ends. A fast lock-on time, e.g. a few dozen microseconds, is desirable, and is likely, since the NTSC interference signal should remain in the passband of the filter circuit 52 and thus the filter 12.

To achieve optimal cancellation of the NTSC interference signal, the gain of each of the filters 12, 14, 16 should be adjusted so that the output of the NTSC signal interference canceler 10 best approaches the true signal of interest ("SOI"), i.e. the HDTV signal. The gain control circuit 42 of FIG. 7a provides a gain control circuit for adjusting the gain G of the filter 12 based on the strength of the NTSC interference signal received.

For optimal cancellation of the NTSC interference signal by the interference canceler 10, the gain of each one of the filters 12, 14, 16 should equal unity minus the ratio of the SOI power level (i.e., without the NTSC interference signal) to the power level of the combined SOI and NTSC interference signal. Power levels are measured within the bandwidth of the measuring bi-quadratic filter.

That is:

$$G_{opt} = 1 - \frac{P\_soi(\omega_c)}{P\_soi(\omega_c) + P\_carrier(\omega_c)} \quad (3)$$

where:

P\_soi(($\omega_c$))=normal power of SOI at frequency $\omega_c$ and,

P\_carrier(($\omega_c$))=power of interfering NTSC carrier signal at $\omega_c$.

Since it is not possible to measure only the power in the SOI at $\omega_c$, which serves as the numerator of equation (3), because the received television signal, at $\omega_c$, also contains the NTSC interference carrier signal, an approximation must be made in order to adjust the gain of the filter 12. Since the power density spectra of the modulation signals for the modulation schemes proposed to be used for HDTV signal transmission are relatively constant, an estimation of P\_soi($\omega_c$) may be made by taking the power measurement at a frequency adjacent to $\omega_c$ where NTSC interference is minimal.

Accordingly, the adjacent frequency must be picked such that it does not fall on a sideband line of the NTSC interference signal, i.e. so that it falls in between the NTSC signal center frequencies. To measure the denominator of equation (3), shown above, which represents the power of both the HDTV signal and NTSC interference signal at $\omega_c$, the output of the bi-quadratic filter 52 is used by the gain control circuit 42. Once centered, the output of the bi-quadratic filter 52 contains both the SOI, i.e. the HDTV signal, and the interfering NTSC signal at $\omega_c$.

The gain control circuit 42, illustrated in FIG. 7a, measures the estimated power of the SOI at $\omega_c$, i.e. the HDTV signal at $\omega_c$, and the power of the SOI plus the power of the NTSC interference signal at $\omega_c$. These signal power measurements are then used to perform a calculation of the optimal gain, G, for the filter 12 in accordance with equation (3) above. The calculated gain G is used to control the overall gain of the filter 12.

The gain control circuit 42, illustrated in FIG. 7a, comprises a variable weight element 100, a gain calculation logic block 108, a first power estimation circuit block 92 and a second power estimation circuit block 94.

The filtered signal input 19 of the gain control circuit 42 is coupled to a filtered signal input of the variable weight element 100 and to a filtered signal input of the first power estimation circuit block 92. An output 110 of the first power estimation circuit block 92 is coupled to a first input of the gain calculation logic block 108.

The first power estimation block 92 comprises a circuit for squaring the amplitude of an input signal, referred to as a squarer 96, and a low pass filter 98. The filtered signal input of the first power estimation circuit block 92 is coupled to an input of the squarer 96. An output of the squarer 96 is coupled to the input of the low pass filter 98 which, in turn, has an output coupled to the output 110 of the first power estimation circuit block 92.

The first power estimation circuit block 92 receives the filtered television signal, output by the bi-quadratic filter 52, as an input signal. This input signal is then squared by the squarer 96 and then low pass filtered by the filter 98, to average the signal's power. Since the amplitude of the NTSC signal can fluctuate, this power measurement should be done many times a second, at least at a rate equal to the frame rate of NTSC broadcasts. After averaging by the low pass filter 98, the value of the signal supplied to the signal output 110 of the first power estimation circuit block 92 approximates the power of the SOI, i.e. the HDTV signal, plus the power of the NTSC interference signal at $\omega_c$.

The estimated signal power of the combined HDTV signal of interest and the NTSC interference signal at $\omega_c$ is represented by the capital letter B. The estimated signal power B is supplied to the gain calculation logic block 108 which uses the estimated signal power B to calculate the optimal gain of the filter 12.

The second power estimation circuit block 94 has a received television signal input and a frequency control input. The received television signal input of the gain control circuit 42 is coupled to the received television signal input of the second power estimation circuit block 94. The frequency control input of the gain control circuit 42 is coupled to the frequency control input of the second power estimation circuit block 94.

The second power estimation circuit block 94 comprises a bi-quadratic filter 102, a squarer 104 and a low-pass filter 106. The received television signal input of the second power estimation circuit block 94 is coupled to a signal input of the bi-quadratic filter 102. A frequency control input of the bi-quadratic filter 102 is coupled to the frequency control input of the second power estimation circuit block 94.

The second power estimation circuit 94 approximates the SOI power, i.e. the HDTV signal power, at $\omega_c$. As described above, the HDTV signal power density spectrum is likely to be relatively constant across the frequency spectrum of the HDTV broadcast. The NTSC signal interference canceler 10 of the present invention uses this fact to estimate the HDTV signal power by measuring the power at a frequency adjacent to $\omega_c$ where NTSC signal interference is at a minimum and the HDTV signal is at a region in its passband.

Since NTSC broadcasts have sideband lines spaced about the picture carrier approximately 15.734 Khz apart, if the filter 102 can be made narrow enough to measure between the sideband lines one can measure the HDTV signal power level by having the gain control circuit's bi-quadratic filter 102 of the picture carrier filter 12 centered at 23.601 Khz (or any multiple of 15.734 Khz + 15.734/2 Khz) below the NTSC picture carrier interference frequency. To achieve accurate tuning of the gain control circuit's bi-quadratic filter 102, the filter 102 is gang tuned to the bi-quadratic filter circuit 52 via the frequency control input of the bi-quadratic filter 102.

The gain control circuit's bi-quadratic filter 102 has the same transfer function as the bi-quadratic filter circuit 52. Thus, the gain control circuit's bi-quadratic filter 102 may be implemented using the same circuitry as the bi-quadratic filter 52. However, as described above, a frequency offset not used in the filter circuit 52 is used in the filter 102 to insure that the center frequency of the gain control circuit's bi-quadratic filter 102 is located at a center frequency where NTSC signal power is at a minimum.

An output of the gain control circuit's bi-quadratic filter 102 is coupled to the input of the squarer 104.

The squarer 104, in turn, has its output coupled to the input of the low pass filter 106. The output of the low pass filter 106 is coupled to the output 112 of the second power estimation circuit block 94. An output of the second power estimation circuit block 94 is coupled to a second input of the gain calculation logic block 108.

The received television signal which is supplied to the second power estimation circuit block 94 is filtered by the bi-quadratic filter 102. The filtered signal, output by the gain control circuit's hi-quadratic filter 102, approximates the HDTV signal without the NTSC interference signal which is present in the output of the bi-quadratic filter 52.

The signal output by the gain control circuit's bi-quadratic filter 102 is squared by the squarer 104 and then low pass filtered by the filter 106. The filter 106 outputs a signal which approximates the power of the HDTV signal, i.e. the SOI. The approximated HDTV signal power, represented by the capital letter C is supplied to the gain calculation logic block 108 and is used in calculating the optimal gain of the filter 12, in accordance with equation (3) above.

As illustrated in FIG. 7a, a gain control output of the gain calculation logic block 108 is coupled to a gain control input of the variable weight element 100. In this manner, the gain control calculation logic block 108 can supply the variable weight element 100 with a signal G which represents the optimal gain of the filter 12, calculated by the gain calculation logic block 108.

The signal G is used to control the gain of the gain control circuit's variable weight element 100, and thus the overall gain of the filter 12.

An output of the variable weight element 100 is coupled to the NTSC signal output of the gain control circuit 42. The NTSC signal output of the gain control circuit 42 is, in turn, coupled to the NTSC signal output 26 of the picture carrier filter 12.

By adjusting the gain G in accordance with equation (3) above, the output of the picture carrier filter 12 is adjusted so that the output signal approximates the NTSC picture carrier interference signal. This signal, which is output by the picture carrier filter 12, may be subtracted by the adder 18 from the received television signal, which includes the NTSC picture carrier signal interference, leaving the desired HDTV signal at the output 22 of the NTSC signal interference canceler 10.

To implement the gain control circuits 42 of the chrominance filter 14 and audio filter 16, the frequency offset used by each one of the bi-quadratic filters 102 to adjust the filter's center frequency to an NTSC null point, i.e. a frequency where NTSC signal power will be at a minimum, will be different than the 23.601 Khz frequency offset used in the picture carrier filter 12.

To adjust the chrominance and audio filter gains, the estimate of SOI power, i.e. HDTV signal power, should be done at the NTSC null point located approximately 4.2 Mhz away from the picture carrier. This region is fairly close to the chrominance subcarrier and very close to the audio carrier. Since it is a NTSC null point, measurements at this frequency should contain only the HDTV signal power.

Since the power of the received HDTV signal is relatively constant across the frequency spectrum of the HDTV broadcast the SOI power level estimate at a single NTSC null point, e.g., the null point located approximately 4.2 Mhz away from the picture carrier can be used for all filters 12, 14, 16. Thus, each one of the filters 12, 14, 16 need not independently determine the SOI power level in order to calculate the desired gain of each one of the individual filters 12, 14, 16 or to determine if NTSC signal interference is present. Thus, any one of the filters 12, 14, 16 may determine the HDTV signal's power level C in the manner described above. This estimated SOI power level C may then be supplied as an input signal to the second input of the gain calculation logic block 108 of each one of the other filter blocks 12, 14, 16. In this manner, the need for the second power estimation circuit block 94, may be eliminated in all but one of the filters 12, 14, 16 of the NTSC signal interference canceler 10.

While such an approach has the advantage of reducing the amount of circuitry required to implement the NTSC interference canceler of the present invention, it has the drawback of decreasing the accuracy of the gain control circuits' estimation of NTSC interference power. For example, when severe multipath interference exists and the phase and amplitude of the multipath signal causes a null to occur at the reference point 4.2 Mhz away from the frequency of the picture carrier signal, the measurement of the signal of interest power at the reference point may result in a relatively low SOI power estimate compared to the estimated power of the SOI plus the NTSC interference made at the center frequency of the NTSC interference signal component to be isolated.

Thus, by using a single power measurement point which may be some distance away from the power measurement point of the SOI plus NTSC interference, some inaccuracies in the estimation of the strength of the interference signal may result in an overly high estimate of the strength of the NTSC interference signal or a determination that NTSC signal interference is present when there is none. While power estimation inaccuracies due to multi-path distortion may cause the filter to be connected when no interference is present resulting in a decrease in the signal to noise ratio, this is not expected to significantly interfere with signal detection.

In accordance with the above approach, in one embodiment of the present invention, the output 112 of the second power estimation circuit block 94, of the picture carrier filter 12, is coupled to the second input of the gain calculation logic blocks 108 of the gain control circuits 42 of both the chrominance filter 14 and the audio filter 16.

In this embodiment of the present invention, the second power estimation block 94 of the picture carrier filter 12 supplies the gain calculation logic blocks 108 of all three filters 12, 14, 16 with the signal C which represents the estimated power of the HDTV signal at $\omega_c$. Thus, the need to implement a second power estimation circuit block 94, in the all but one of the filters 12, 14, 16 is eliminated.

By eliminating the need for two of the three second power estimation blocks 94, two fewer bi-quadratic filters 103, squarers 104 and lowpass filters 106 are required to implement the NTSC signal interference canceler 10 of the present invention. Thus, this embodiment of the present invention provides the opportunity for a meaningful cost savings due to the reduced number of parts required to implement the interference canceler 10, with possibly no substantial effect on the overall performance of the NTSC signal interference canceler 10.

Referring now to FIG. 7b, there is illustrated another embodiment of the picture carrier filter 12 of the real NTSC canceler 10. In the embodiment illustrated in FIG. 7b, the filter 12 has a fixed gain and a circuit for disconnecting the filter when NTSC interference is not detected or is below a predetermined level. Elements in FIGS. 7a and 7b which are the same or similar are assigned the same reference numbers for convenience.

While the use of adaptive notch depths provide for optimal NTSC signal cancellation, filters 12, 14, 16 with fixed notch depths may be used to provide a useful degree of NTSC interference cancellation. Accordingly, in the embodiment illustrated in FIG. 7b, the variable gain element 100 of FIG. 7a is replaced in FIG. 7b with a fixed weight element 151. While fixed gains G may be selected to provide optimal signal cancellation, to simplify the hardware implementation of the fixed gain element 151, a fixed gain G which is a power of two may be used.

In one embodiment, the filters 12, 14, 16 were implemented in a simulation using notch filters with fixed gains which were a power of two. In addition, first and second luminance sideband filters were used to improve NTSC signal interference cancellation. Below is a table listing the filter used in one embodiment of the present invention, the gain, and the attenuation of the NTSC signal component resulting from the use of the particular fixed depth notch filter listed in the first column.

TABLE I

| NTSC Component About Which Notch Filter is Centered | Fixed Gain Of The Filter | Attenuation Of The Interference Component (Db) |
|---|---|---|
| Audio | .96875 | ~28 |
| Chrominance | .96875 | ~28 |
| Picture Carrier | .96875 | ~28 |
| First Picture Carrier Sideband Pair | .875 | ~18 |
| Second Picture Carrier Sideband Pair | .75 | ~12 |

To avoid the undesirable effect of attenuating the signal of interest when little or no NTSC interference is present and fixed gain notch filters 12, 14, 16 are used, a method of disconnecting each filter 12, 14, 16 when there is little or no NTSC interference present is employed. Accordingly, in one embodiment, a means for detecting the presence of NTSC interference and disconnecting each filter 12, 14, 16 is provided.

Referring again to FIG. 7b, it can be seen that the representative filter 12 comprises a gain control circuit 150, which unlike the gain control circuit 42 of FIG. 7a, has a fixed gain G. The gain control circuit 150 comprises a first and second power estimation circuits 92 and 94, respectively, a threshold compare circuit 152, the fixed weight element 151 and a switch 154.

The first and second power estimation circuit blocks 92, 94 operate as described above in regard to FIG. 7a. The output of the first power estimation block 92 is coupled to a first input of the threshold compare circuit 152 while the output of the second power estimation circuit 94 is coupled to a second input of the threshold compare circuit 152. In this manner, the threshold compare circuit 152 receives the output signal B, which approximates the power of the SOI, i.e. the HDTV signal, plus the power of the NTSC interference signal at $\omega_c$, from the first power estimation circuit block 92 and the signal C, which approximates the power of the SOI, from the second power estimation circuit 94.

The threshold compare circuit compares the value of the received signals B and C to determine the amount of NTSC interference present. If the NTSC interference is determined to be sufficiently large that the use of the filter 12, with a fixed gain, will increase signal detection probability, the switch 154 is closed so that the interference signal isolated by the filter 12 will be subtracted from the received signal.

To determine the amount of NTSC interference present and whether the switch 154 should be closed, the threshold compare circuit 152 compares the estimated power of the SOI plus NTSC interference signal, B, to the estimated power of the SOI, C to generate a power ratio of B:C. The result of the compare operation, e.g., the power ratio, is indicative of the amount of NTSC interference present.

In the embodiment described above in Table I, simulations have shown that if the power ratio of B:C is greater than, or equal to, two to ones connection of the filters 12, 14, 16, will increase the probability of signal detection. However, if the power ratio of B:C is less than two to one connection of the filters 12, 14, 16 is undesirable and may lead to a decrease in the probability of signal detection. Accordingly, in the embodiment of Table I, the threshold compare circuit 152 outputs a signal to close the switch 154 whenever the power ratio of B:C is greater than or equal to, two to one, and to open the switch when the power ratio is less than two to one.

In one embodiment of the present invention, a single fixed gain filter 12, 14, or 16 includes a gain control circuit 150 with first and second power estimating circuit blocks 92, 94 and a threshold compare circuit 152. The output of the threshold compare circuit 152 is coupled to the switch 154 of each of the filters 12, 14, 16 to control the switches for connecting and disconnecting each of the filters 12, 14, 16. In this manner, the need for more than a single first power estimating circuit block 92 and a single second power estimating circuit block 94 is eliminated.

Referring now to FIG. 8, still another embodiment of the filter circuits of the present invention is shown. Components of the filter circuit 12 of FIG. 8, are the same or similar to the components of FIG. 7 and are, for convenience, numbered the same in both figures. As illustrated in FIG. 8, the filter circuit 12 may further comprise an odd length finite impulse response ("FIR") passband filter 118, having n taps where n is an odd number, and a delay element 120 having a delay of $(n-1)/2$.

The FIR passband filter 118 has an input coupled to the received television signal input 24 of the filter 12 and an output coupled to the received television signal input of the phase detector 56.

The passband filter 118 has a passband width wide enough to permit the NTSC signal component which is to be isolated, i.e., the picture carrier signal, to pass through but narrow enough to insure that the other major NTSC signal components are outside the passband of the filter 118.

The delay element 120 has an input coupled to the quadrature signal component output of the bi-quadratic filter 52 and an output coupled to the quadrature signal component input of the phase detector 56.

As described above, the delay element 120, which is used to compensate for the signal delay introduced by the filter 118, has a delay of $(n-1)/2$ where the number n corresponds to the number of taps present in the passband filter 118 and where n is an odd number.

By using the passband filter 118, major NTSC signal components other than the NTSC signal component to be isolated are filtered from the received television signal supplied to the phase detector 56. This facilitates centering of the notch of the filter 12 about the NTSC component signal of interest since the error signal output by the phase detector 56, which is used by the frequency integrator 54 to adjust the center frequency of the filter 12, will not be significantly influenced by major NTSC signal components other than the one which is to be isolated by the filter 12.

Accordingly, by using the passband filter 118 and the delay element 120, the time needed to match the center frequency of the filter 52, and thus the filter 12, to the frequency of the NTSC interference signal component to be isolated, may be decreased.

It is desirable to make all of the filters 12, 14, 16 of the real NTSC signal interference canceler 10 narrow enough to avoid the possibility of removing some of the HDTV signal along with the NTSC interference signal. To achieve a satisfactorily narrow filter, it is expected that the numerical precision needed will be 16×16 multiplies with 24-32 bits of accumulation. If this numerical precision is not feasible, precision may be relaxed at the expense of wider filters.

The above numerical precision will result in a filter transfer function with alpha being equal to 0.995 in the case of the filter illustrated in FIG. 4 and an alpha equal to 0.005 in the case of the bi-quadratic filters 52, 102 of FIGS. 7 and 8. As described above, the value of alpha controls the placement of the filter's poles from the unit circle and the bandwidth of the filter. As alpha increases towards 1, in the case of the filter 11 of FIG. 3, and as alpha decreases towards zero in the case of the filters 52, 102 illustrated in FIGS. 7 and 8, the filters 12, 14, 16 become narrower. For example, at a sampling rate of 20 million samples per second, use of an alpha with a magnitude equal to 0.995 in the case of the filter 11 of FIG. 3, and an alpha of 0.005 in the case of the filters 52, 102 of FIGS. 7 and 8, will produce a filter with a 16 Khz bandwidth at the 3 dB point.

In addition to providing circuitry for adjusting both the gain of the filters 12, 14, 16, and the center frequency of the filters 12, 14, 16, it is possible to implement a circuit which would automatically adjust the bandwidth of the filters 12, 14, 16, to an optimal width in order to remove the interference signal while minimizing the loss of the signal of interest, i.e. the HDTV signal. In particular, it is expected that for the optimal performance the width of the audio filter should be greater than the width of the chrominance or picture carrier filters of the NTSC signal canceler of the present invention.

While the above description relates primarily to various embodiments of the real NTSC interference canceler of the present invention, which incorporate real recursive filters, i.e., filters that do not use complex math to process the received signal, the NTSC interference canceler of the present invention may also be implemented using complex recursive digital filters, i.e., filters which process the received television signal with NTSC interference using complex math. Such an implementation results in a "complex" NTSC interference canceler, capable of processing complex television signals, which is particularly well suited for use in television systems implemented in accordance with a baseband demodulator architecture.

As will become apparent, the general design of a complex NTSC interference canceler in accordance with the present invention is related to the designs already discussed with regard to embodiments of the real NTSC interference canceler 10 of the present invention. However, the complex NTSC interference canceler is better suited for use in a baseband demodulator architecture because of its ability to process both the I- and Q- received television signals simultaneously.

Figure 9:
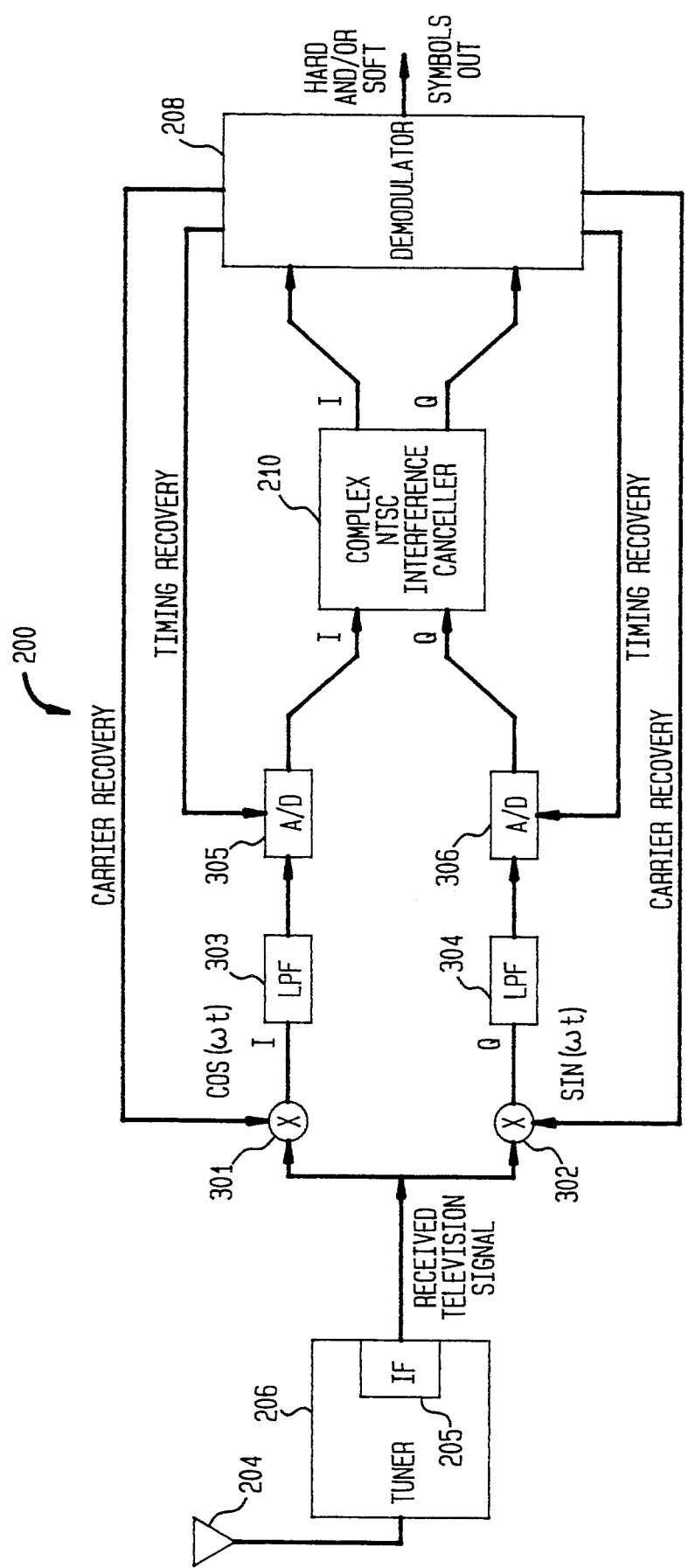
FIG. 9 is a schematic block diagram of an antenna through demodulator portion of a receiver, incorporating a complex NTSC canceler in accordance with another exemplary embodiment of the present invention.

Referring now to FIG. 9, there is illustrated a television receiver, generally indicated by the reference numeral 200, incorporating a complex NTSC interference canceler 210, in accordance with an exemplary embodiment of the present invention. The television receiver 200 comprises an antenna 204, a tuner 206, a first and second mixer 301, 302, a first and second low pass filter 303, 304, a first and second A/D converter 306, 306, the complex NTSC interference canceler 210 and a demodulator 208.

The output of the antenna 204 is coupled to the input of the tuner 206. The tuner 206 may comprise, e.g., an IF stage 205 which couples the signal input of the tuner 206 to a tuner output. The output of the tuner 206 is coupled to a first signal input of the first and second mixers 301, 302. A second input of the first mixer 301 is coupled to a cos ($\omega(t)$) carrier recovery signal output of the demodulator 208 while a second input of the second mixer 302 is coupled to a sin ($\omega(t)$) carrier recovery signal output of the demodulator 208.

By mixing the signals received at the mixer's first and second inputs, the IF received television signal, including both the HDTV signal and NTSC interference, is mixed down to baseband. In this manner, the first mixer 301 generates an analog I- received television signal which is supplied to the input of the first lowpass filter 303. This baseband I- received television signal comprises both the desired I- HDTV signal and the undesired I- NTSC interference signal.

The second mixer 304, on the other hand, generates an analog Q- received television signal which is supplied to the second lowpass filter 304. This Q- received television signal comprises both the desired Q- HDTV signal and the undesired Q- NTSC interference signal. The first and second lowpass filters 303, 304 perform lowpass filtering of the I- and Q- received television signals, respectively, to remove second order products resulting from the mixing operation.

The output of the first lowpass filter 303 is coupled to a corresponding signal input of the first A/D converter 305. The output of the second lowpass filter 304 is coupled to a corresponding signal input of the second A/D converter 306. In this manner, separate signal paths are created for the I- and Q- received television signals with the I- received television signal being processed along the path formed by the first lowpass filter 303 and the first adder 305, and the Q- received television signal being processed along the signal path formed by the second low pass filter 304 and A/D converter 306.

The first and second A/D converters 305, 306 each have a sampling rate control signal input which is coupled to a separate timing recovery signal output of the demodulator 208. The demodulator 208 thus controls the sampling rate of the first and second A/D converters 305, 306. The first A/D converter 305 generates a digital I- received television signal while the second A/D converter 306 generates a digital Q- received television signal. These digital I- and Q- received television signals include both the desired HDTV signal and the undesired NTSC interference signal.

The I- received television signal output of the first A/D converter 305 is coupled to a corresponding input of the complex NTSC interference canceler 210. Similarly, the Q- received television signal output of the second A/D converter is coupled to the corresponding Q- signal input of the complex NTSC interference canceler 210.

As will be described in greater detail below, the I- and Q- received television signals are processed by the NTSC interference canceler 210 through the use of complex recursive IIR filters to generate I- and Q- HDTV signals which are supplied to the corresponding I- and Q- signal inputs of the demodulator 208. The demodulator 208, in turn, generates either a hard and/or soft symbols output, from the received I- and Q- HDTV signals, which is supplied to the next stage in the receiver 200 for further processing before being ultimately supplied to a display device.

Figure 10:
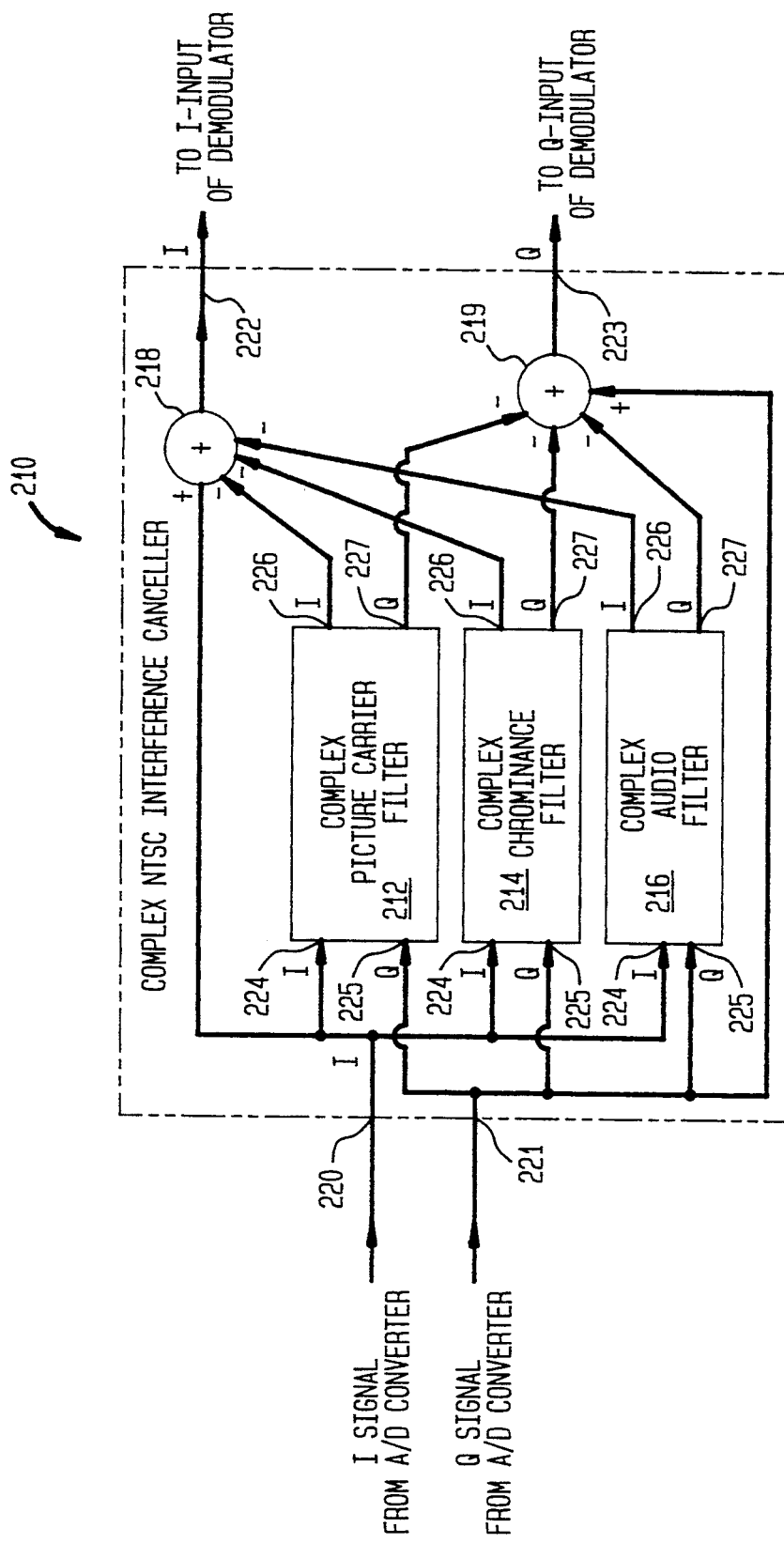
FIG. 10 is a block diagram of a complex NTSC signal interference canceler according to an exemplary embodiment of the present invention.

FIG. 10 illustrates a schematic block diagram of an exemplary embodiment of a complex NTSC interference canceler 210 which may be used as the complex interference canceler illustrated in FIG. 9. As is evident from a comparison of FIG. 10 and FIG. 2, the overall structure of the complex NTSC interference canceler 210 is basically the same as for the real implementation with the difference in structure being the result of the need to process both the I- and Q- received television signals as opposed to a single received television signal.

The complex NTSC interference canceler 210 comprises a first and second adder 218, 219, in addition to a first, second and third complex recursive filter circuits 212, 214, 216. Each of the first, second and third complex filter circuits 212, 214, 216 correspond to a different one of the three major NTSC signal components to be isolate, i.e., the picture carrier signal, the chrominance subcarrier signal and the audio carrier signal respectively.

Each one of the first, second and third complex recursive filters circuits 212, 214, 216 have I- and Q- received television signal inputs 224, 225. Each recursive filter's I- received television signal input 224 is coupled to the output of the first A/D converter 305 while each recursive filter's Q- received television signal input is coupled to the output of the second A/D converter 306. In this manner, each of the recursive filter circuits 212, 214, 216 receive the I- and Q-received television signals which include both the desired HDTV signal and the NTSC interference signal. The complex recursive filter circuits 212, 214, 216 process the I- and Q- received television signals using complex math to isolate the NTSC interference signal components. In processing the I- and Q- received television signals, the first, second, and third complex filter circuits 212, 214, 216 act as notch filters isolating the I- and Q- portions of the NTSC interference signal components for subtraction from the corresponding I- and Q- received television signals.

The first, second, and third complex filter circuits 212, 214, 216 each have I- and Q- signal outputs 226, 227. Each one of the I- signal outputs 226 is coupled to a subtracting input of the first adder 218 while each of the Q- signal outputs 227 are coupled to a subtracting input of the second adder 219.

The first adder 218 also has an I- received television signal input which is coupled to the I- received television signal output of the A/D converter 305. The first adder 218 receives the I- received television signal which includes the desired I- HDTV signal and the undesired I- NTSC interference signal and subtracts the isolated I- portion of the NTSC interference signal components from the I- received television signal to generate the desired I- HDTV signal at its output.

Similarly, the second adder 219 has a Q- received television signal input coupled to the Q- received television signal output of the A/D converter 306. The second adder 219 receives the Q- received television signal and subtracts the isolated Q- NTSC interference signal components from the Q- received television signal to generate the desired Q- HDTV signal at its output.

The I- HDTV signal output of the first adder 218 is coupled to the corresponding output 222 of the complex NTSC interference canceler 210, while the Q- HDTV signal output of the second adder 219 is coupled to the corresponding output 223 of the complex NTSC interference canceler 210.

As with the real NTSC interference canceler implementations, the first, second, and third complex filter circuits 212, 214, 216 which comprises the complex interference canceler, may contain the same or similar filter circuitry and thus may be interchangeable. However, while the three filter circuits 212, 214, 216 may contain the same circuitry, each one of the filters 212,214, 216 has a different gain and center frequency selected to correspond to the particular NTSC signal component the filter circuits 212, 214, 216 is designed to isolate.

While there is a great deal of similarity between the real and complex NTSC interference canceler embodiments, the following discussion will focus on some of the features that make the complex NTSC interference implementation different from the real implementation. The changes needed to implement the various embodiments of the real NTSC interference canceler already described, in a corresponding embodiment using complex filter circuits 212, 214, 216 will also be discussed. From the following disclosure it will become readily apparent that the complex NTSC interference canceler of the present invention can be implemented in a manner that corresponds to each of the previously described embodiments of the real NTSC interference canceler of the present invention.

The concept and design of the complex NTSC interference canceler of the present invention is essentially the same as that for the real NTSC interference canceler. This becomes evident from a comparison of FIGS. 2 and 6. As illustrated, in both embodiments the first, second, and third notch filter circuits 12, 14, 16 and 212, 214, 216, are used to isolate each one of the three major NTSC signal components, i.e., the picture carrier, chrominance subcarrier, and audio carrier components, so that they can then be subtracted from the received television signal which includes the NTSC signal interference.

However, in the complex embodiment complex recursive filter circuits 212, 214, 216 which are capable of processing in-phase and quadrature phase signals simultaneously, are used as opposed to real recursive filters 12, 14, 16.

The internal design of the complex filter circuits 212, 214, 216 is basically the same as the design of the real filter circuits 12, 14, 16 with the major difference being the use of complex components, and a complex recursive passband filter in particular, capable of processing both the I- and Q- received television signals as opposed to merely the real television signal.

The design of the complex notch filter circuit 212, which is also representative of the design of filter circuits 214, 216, will now be discussed with reference to the exemplary embodiment illustrated in FIG. 11.

Figure 11:
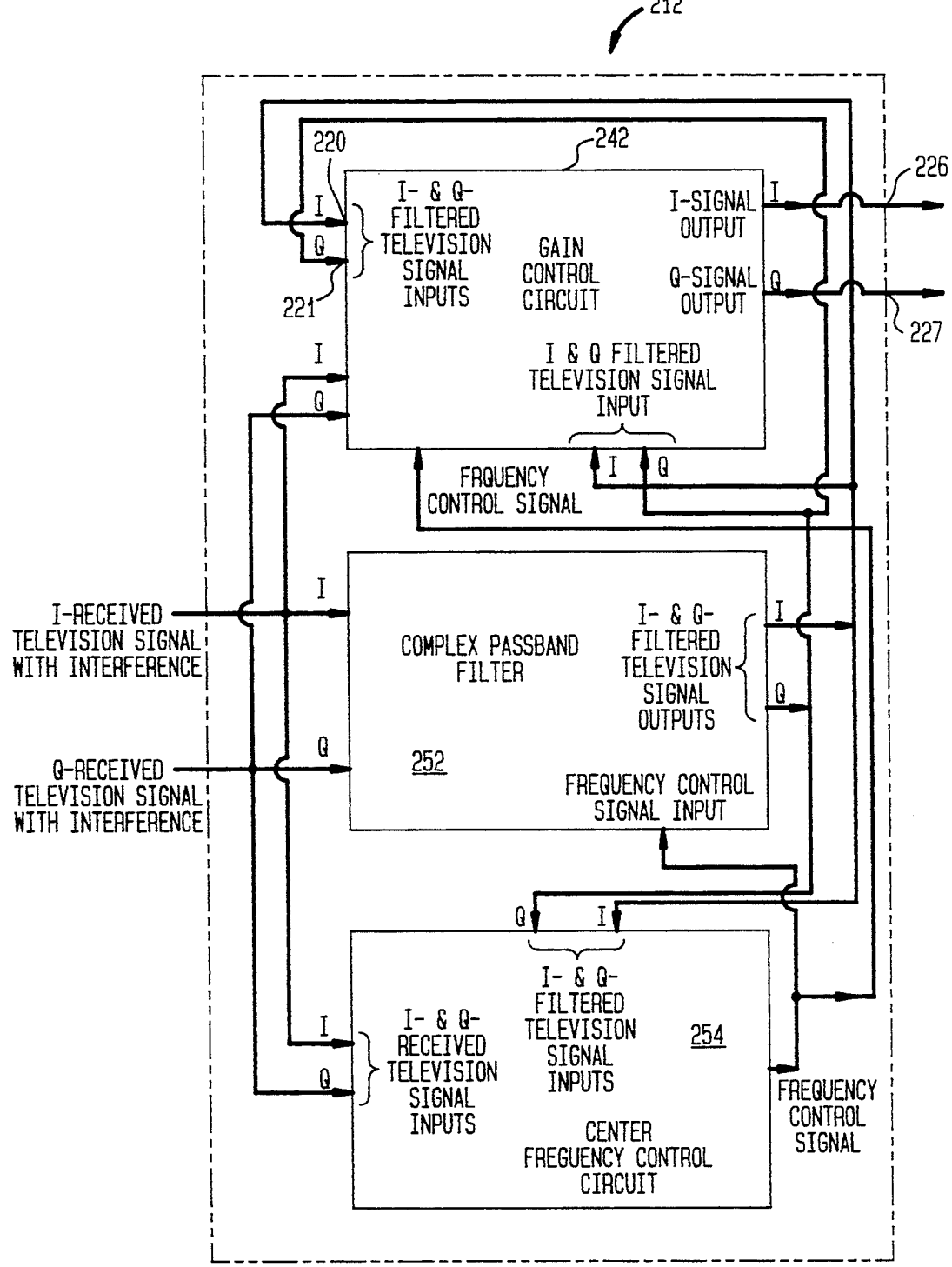
FIG. 11 is a block diagram of a complex filter circuit which may be used as any one of the filters of the NTSC signal interference canceler illustrated in FIGS. 9 and 10.

As illustrated in FIG. 11, the complex recursive filter circuit 212 comprises a gain control circuit 242, a complex passband filter 252 and a center frequency control circuit 254.

The complex passband filter 252, the frequency control circuit 254 and the gain control circuit 242 all have I- and Q- received television signal inputs. These I- received television signal inputs are coupled to the I- television signal output of the first A/D converter 305 while the Q- received television signal inputs are coupled to the output of the second A/D converter 306.

In addition to the I- and Q- received television signal inputs, the complex passband filter 252 also has a frequency control signal input for receiving a center frequency control signal for controlling the center frequency of the passband filter 252.

The complex passband filter 252 has an I- filtered television signal output which is coupled to a corresponding input of the frequency control circuit 254 and the gain control circuit 242. Similarly, it has a Q-filtered signal output which is coupled to a corresponding input of the frequency control circuit 254 and gain control circuit 241.

The frequency control circuit 254 receives the I- and Q-received television signals output by the A/D converters 305, 306 and the I- and Q- filtered television signals, output by the passband filter 252. The frequency control circuit 254 uses these signals, as will be described below, to generate a frequency control signal. A frequency control signal output of the center frequency control circuit 254 is coupled to the corresponding inputs of the complex passband filter 252 and gain control circuit 242. This frequency control signal is used to control, e.g., the center frequency of the complex passband filter 252 and a filter contained within the gain control circuit 242.

The I- and Q- filtered television signal outputs of the complex passband filter 252 are coupled to corresponding inputs of the gain control circuit 242. The gain control circuit 242 receives these signals and generates the I- and Q- signals output by the filter 212, which represent the I- and Q- portions of the isolated NTSC interference signal component, by controlling the gain of the filtered I- and Q- television signals.

In one embodiment, the gain of the signals if adaptively determined based on the estimated strength of the NTSC interference signal. In another embodiment, a fixed gain is applied to the I- and Q- filtered signals but the output of the gain control circuit is disconnected when the gain control circuit determines that NTSC interference is not present. Thus, in such an embodiment, the gain control circuit controls the gain by providing either a fixed gain or, effectively, zero gain, to the I- and Q- filtered televisions signals output by the complex passband filter 252.

Thus, as is evident from a comparison of FIG. 11 and FIG. 6, to create a complex NTSC interference canceler that corresponds to an embodiment of a real NTSC interference canceler of the present invention a complex recursive passband filter 252 must be substituted for the real recursive bi-quadratic filter 52 used in the real interference canceler embodiments. A complex gain control circuit 242 and a complex center frequency control circuit 254 may also substituted for the corresponding real gain and frequency control circuits.

While the major components of the complex filter 212 are implemented in the complex domain, the concept of moving the center frequency of each notch and how the filter circuits 214, 216 can be slave tuned, e.g., to the picture carrier filter circuit 212, remain the same as in the case of the real filter circuit embodiments.

In view of the above, it is clear that in order to implement the complex NTSC interference canceler of the present invention, a complex passband filter 252 must be used. Thus, it becomes necessary to develop a one sided complex passband filter 252. A complex power estimation circuit for use in a complex gain control circuit 242, and a complex frequency control circuit 254, will also be derived for use with the complex passband filter 252.

Figure 12:
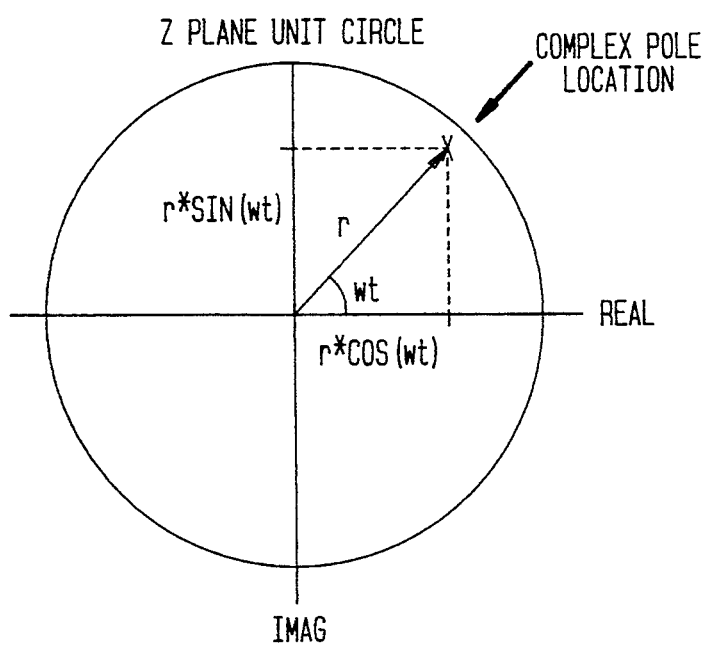
FIG. 12 is a block diagram of a Z plane unit circle illustrating the location of a complex pole of a complex passband filter which may be used as the passband filter of the filter circuit illustrated in FIG. 11.

The complex passband filter implementation will now be derived with reference to FIG. 12. FIG. 12 shows a single pole placed in the complex Z plane. This will yield a complex passband filter with a center frequency of $(\omega_t)$ where $\omega_t$ is in radians. The bandwidth is controlled by the distance from the unit circle, which is shown by the radius value (r). The transfer function of this filter is derived as follows:

$$H(z) = \frac{y(z)}{x(z)} = \frac{(1-r)}{(1-Z^{-1}*P)}$$

where:
P is the complex pole location;
r is the radial distance of the pole; and
$P = r*e^{(j\omega t)}$ Thus, the difference equation for this complex passband filter may be derived as follows:

$$y(n) - P*y(n-1) = x(n)*(1-r)$$

which provides $$y(n) = x(n)*(1-r) + P*y(n-1)$$

Since x, y, and p are complex inputs and outputs, we can write the above equation into real and imaginary terms (xr, xi, yr, yi, Pr, Pi) to yield:

$$yr(n) + j*yi(n) = (xr(n) + J*xi(n))*(1-r) + (Pr+j*Pi)*(yr(n-1) + j*yi(n-1))$$

and, $$yi(n) = xi(n)*(1-r) + Pi*yr(n-1) + Pr*yi(n-1);$$

and $$yr(n) = xr(n)*(1-r) + Pr*yr(n-1) - Pi*yi(n-1)$$

Expanding Pr and Pi in terms of the pole's radial distance and angular position $(\omega_t)$ yields:

$$Pr = r*\cos(\omega_t)$$

$$Pi = r*\sin(\omega_t)$$

Plugging this into the above equation yields the final filter difference equation:

$$yr(n) = xr(n)*(1-r) + r*\cos(\omega_t)*yr(n-1) - r*\sin(\omega_t)*yi(n-1)$$

$$yi(n) = xi(n)*(1-r) + r*\sin(\omega_t)*yr(n-1) + r*\cos(\omega_t)*yi(n-1)$$

Figure 13:
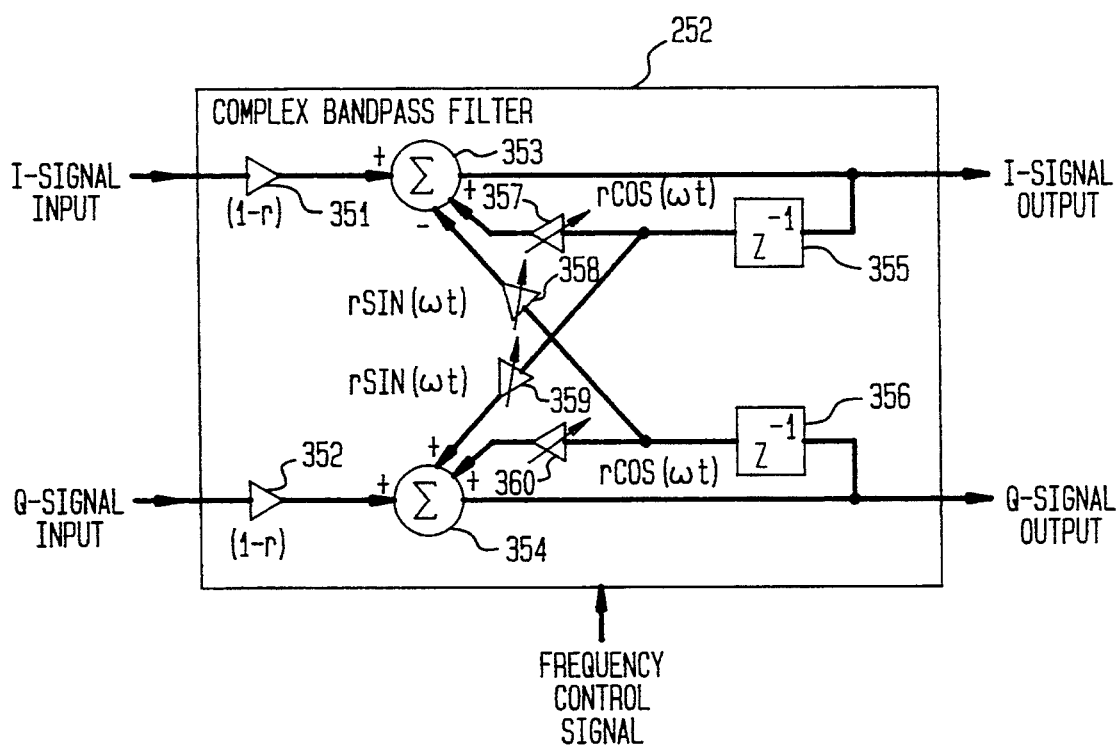
FIG. 13 is a block diagram of a circuit that can be used as the complex passband filter of the complex filter circuit of FIG. 11.

This cross coupled difference equation which represents a complex recursive passband filter can be implemented by the circuit 252 illustrated in FIG. 13.

The amplitude/phase responses associated with the complex passband filter circuit 252 is generally as illustrated in FIG. 5 which also serves as the illustration of the amplitude/phase response of the filter circuits 12, 14, 16 used in the real NTSC interference canceler embodiment of the present invention. The center frequency $\omega_t$ of the complex recursive passband filter circuit 252 corresponds to $\omega_c$ illustrated in FIG. 5. The transfer function illustrated in FIG. 5, while representative of the transfer function performed between the input and real in-phase output of the real filter circuit 52, is also indicative of the complex transfer function performed on between the complex input and complex output of the recursive passband filter circuit 252 illustrated in FIG. 13. Accordingly, FIG. 5 is representative of the complex transfer function performed on the complex television signal, comprising both an I- and Q- television signals, received at the input of the complex recursive passband filter circuit 252.

Referring once again to FIG. 3, the typical overall amplitude response of the complex NTSC interference canceler 210 is shown. This overall response is generally the same as previously described with regard to the real NTSC interference canceler 10. The illustrated amplitude response is representative of the amplitude response between the complex NTSC interference filter's complex input, comprising the I- and Q- signal inputs, and complex output, comprising the I- and Q- signal outputs. Each one of the complex filters 212, 214, 216 is responsible for a corresponding one of the notches shown. The depths of each notch are controlled by each filter's individual gain which is designed to reflect the strength of each expected interfering NTSC signal component.

Referring now to FIG. 13, there is illustrated a complex recursive passband filter 252 in accordance with one embodiment of the present invention. The passband filter 252 comprises a first and second fixed weight elements 351, 352, a first and second summer 353, 354, a first and second first order unit delay element 355, 356 and a first through fourth variable weight element 357, 358, 359, 360.

An I- received television signal input of the complex passband filter 252 is coupled to the input of the first fixed weight element 351 which in turn has its output coupled to a first summing input of the first summer 353. The output of the summer 353 constitutes the I-filtered signal output of the complex passband filter 252. The output of the first summer 353 is coupled to the input of the first unit delay element 355 which has its output coupled to the signal input of the first and third variable weight elements 357, 359. The output of the first variable weight element 357 is coupled to a second summing input of the first summer 353.

The Q- received television signal input of the complex passband filter 252 is coupled to the input of the first fixed gain element 352 which, in turn, has its output coupled to a first summing input of the second summer 354. The output of the second summer 354 is coupled to the input of the second unit delay element 356. The output of the second unit delay element 356 is coupled the input of the second variable weight element 358 and to the input of the fourth variable weight element 360.

The output of the second variable weight element 358 is coupled to a subtracting input of the summer 353 while the output of the fourth variable weight element 360 is coupled to a second summing input of the second summer 354.

The first and second fixed weight elements 351, 352 have the same gain of $(1-r)$ while the first and fourth variable gain elements have a gain of $r\cos(\omega_t)$ and the second and third variable weight elements have a gain of $r\sin(\omega_t)$.

A frequency control signal input of the first through fourth variable weight elements 357, 358, 359, 360 is coupled to a frequency control signal input of the complex passband filter 252. In this manner, each variable weight element is supplied with the appropriate $\cos(\omega_t)$ or $\sin(\omega_t)$ value from, e.g., the output of the frequency control circuit 254.

As described above with regard to the complex interference canceler of the present invention, to adjust the center frequency of each filter circuit 212, 214, 216 a center frequency control circuit 254 is needed. A single center frequency circuit 254 can be used for all the filter circuits 212, 214, 216 with all the filters not containing the frequency control circuit 254 being gang tuned to the output of the frequency control circuit 254.

Figure 14:
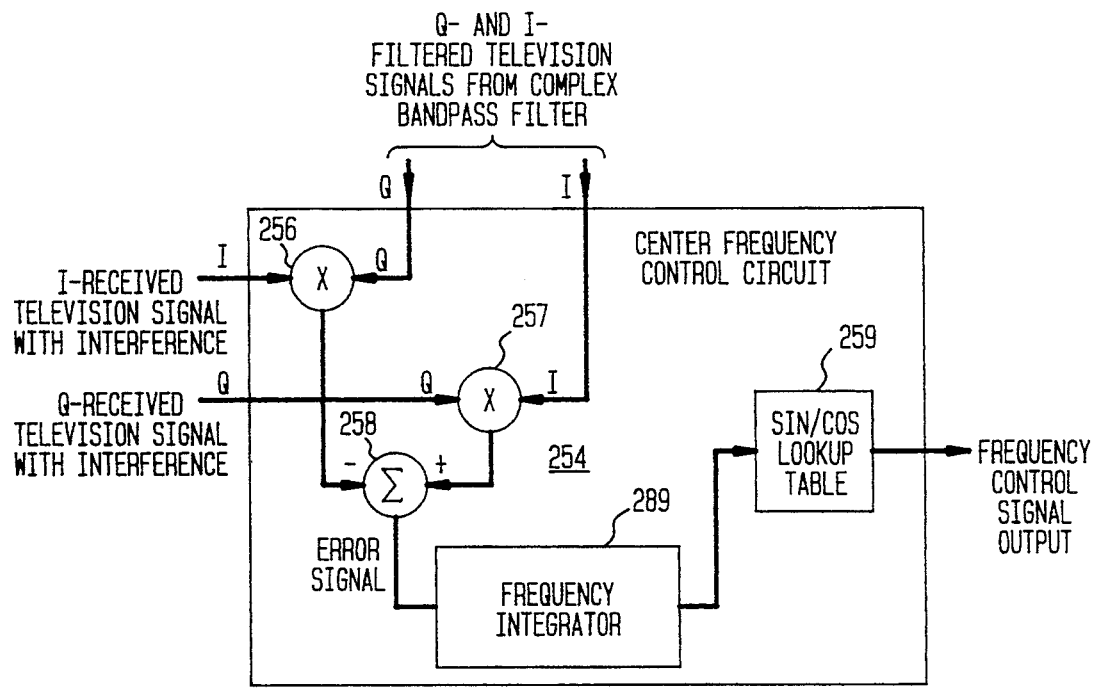
FIG. 14 is a schematic block diagram of a frequency control circuit that can be used as the frequency control circuit of the complex filter circuit of FIG. 11.

A complex center frequency control circuit which can be used as the complex frequency control circuit 254 of the embodiment illustrated in FIG. 11, will now be described with reference to FIG. 14. The center frequency control circuit 254 comprises a first cross-correlator 256, a second cross-correlator 257, a summer 258, a frequency integrator 289 and a sin/cos lookup table 259.

The complex center frequency control circuit 254 uses standard phase locked loop techniques to cross correlate the complex input signal of the passband filter 252 with its complex filtered signal output to generate an error signal. Phase lock is achieved when the cross product of these two signals, which when subtracted, as described below, results in zero bias.

The first cross-correlator 256 has an I-received television signal input and a Q- filtered television signal input coupled to the corresponding outputs of the first A/D converter 305 and the complex passband filter 252, respectively. The second cross-correlator 257 has a Q-received television signal input coupled to the output of the second A/D converter 306 and a I- filtered television signal coupled to the corresponding output of the complex passband filter 252.

The first cross-correlator 256 has its output coupled to a subtracting input of the summer 258 while the second cross-correlator 257 has its output coupled to a summing input of the summer 258. The summer 258 subtracts the output of the first cross-correlator 256 from the output of the second cross-correlator 257 to generate the phase error signal. The generation of this phase error signal can be represented in the following manner:

$$e = Qi^*Io - Ii^*Qo$$

where:
Ii = the real part of the complex passband filter input;
Qi = the imaginary part of the complex passband filter input;
Io = the real part of the complex passband filter output;
Qo = the imaginary part of the complex passband filter output.

The summer 258 has its output coupled to the input of the frequency integrator 289. The design and operation of the frequency integrator 289 is the same as, or similar to the frequency integrator 54 previously described above. The output of the frequency integrator 289 is coupled to the input of the sin/cos lookup table 259 which generates the frequency control signal which includes the $\cos(\omega_t)$ and $\sin(\omega_t)$ values used to control the frequency of the complex passband filter 252. In an alternative embodiment, the output of the frequency integrator could be supplied directly to the complex passband filter 252 which could then perform any necessary sin/cos lookup operations.

Figure 15:
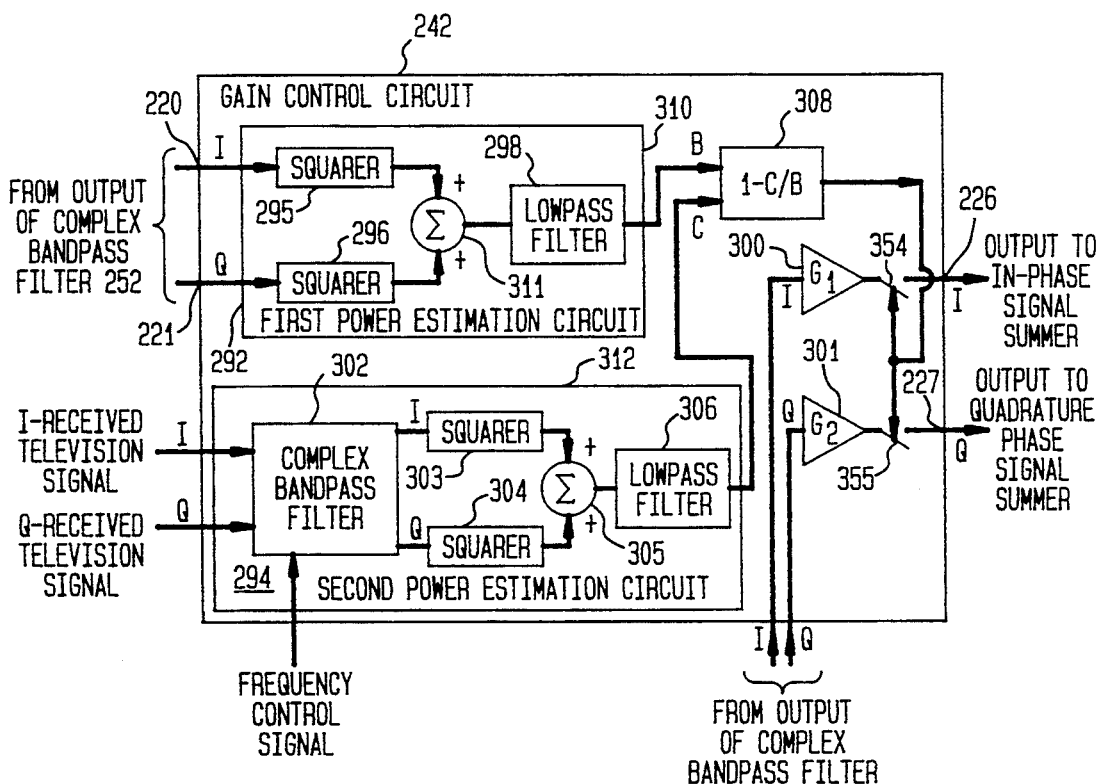
FIG. 15 is a schematic block diagram of a gain control circuit that can be used as the gain control circuit of the complex filter circuit of FIG. 11.

The design of a complex gain control circuit will now be described with reference to FIG. 15. Referring now to FIG. 15, there is illustrated a complex gain control circuit 242 which may server as the gain control circuit of the complex filter circuit 212 of FIG. 11. The gain control circuit 242 comprises a first power estimation circuit 292, a second power estimation circuit 294, a gain calculation logic block 308, first and second fixed gain elements 300, 301, and first and second switches 354, 355. In the illustrated embodiment, the gain calculation logic block 308 acts as a threshold compare circuit.

The I- filtered television signal received by the gain control circuit is supplied to the first fixed weight element 300. The output of the first fixed weight element, with a gain of G1, is coupled to the first switch 354 which, in turn has its output 226 coupled to the I- NTSC interference signal output of the filter 212.

The Q-filtered television signal received by the gain control circuit 242 is supplied to the input of the second fixed weight element 301 which has a gain of G2. The output of the fixed weight element G2 is coupled to the input of the second switch 355 which, in turn, has its output 227 coupled to the Q- NTSC interference signal output of the filter 212.

The gains G1 and G2 are selected based on the expected strength of the I- and Q- portions of the NTSC signal component to be isolated. The switches 301 and 302 are used to selectively connect and/or disconnect the output of the fixed weight elements 301, 302 to the corresponding I- and Q- signal outputs of the gain control circuit 242 as a function of the strength of the NTSC interference signal as will be described below.

The gain control circuit's first power estimation circuit 292 has a first squarer 295 coupled to the I- filtered signal input of the gain control circuit 242. The output of the first squarer 292 is coupled to a first summing input of a summer 311.

The first power estimation circuit further comprises a second squarer 296 that has an input coupled to the Q-filtered signal input 221 of the gain control circuit 242. The output of the second adder 296 is coupled to a second summing input of the summer 311 which, in turn, has an output coupled to the input of a lowpass filter 298. The output of the lowpass filter is a signal B which approximates the power of the SOI, i.e., the HDTV signal, plus the power of the NTSC interference signal at $\omega_c$, the center frequency of the complex passband filter 52. The value of $\omega_c$ is determined by the selection of the appropriate value for $\omega_t$ to achieve the desired notch placement, in accordance with the above described difference equations which relate to the complex passband filter 252. As is evident from a comparison of this complex first power estimation circuit 292 and the corresponding real embodiment of the power estimation circuit, e.g. circuit 92, the principle difference is that the complex implementation receives both the I- and Q- filtered signals, which are then squared and summed, as opposed to merely a single real signal.

The second power estimation circuit 294 comprises a complex passband filter which is the same as the complex passband filter 252 but with a center frequency located at an NTSC null point, a first and second squarer 303, 304, a summer 305 and a lowpass filter 306. The complex passband filter 302 has both I- and Q- received televisions signal inputs and I- and Q- filtered television signal outputs. A frequency control input is coupled to the frequency control signal output of the frequency control circuit 254. The I- and Q- filtered signal outputs are coupled to corresponding inputs of the first and second squarers 303, 304, respectively. The squares 303, 304 receive the I- and Q- filtered signals output by the filter 302, square them and supply the resulting signal to first and second inputs of the summer 305, respectively. The summer 305 generates a signal which is supplied to the lowpass filter 306 which has its input coupled to the output of the summer 305. The output of the lowpass filter 306 is supplied to the output 312 of the second power estimation circuit 294. Thus, the second power estimation circuit generates the signal C which represents the estimated power of the HDTV signal, i.e., the SOI, at $\omega_c$.

The output of the first power estimation block 292 is coupled to a first input of the threshold compare circuit 308 while the output of the second power estimation circuit 294 is coupled to a second input of the threshold compare circuit 308. In this manner, the threshold compare circuit 308 receives the output signal B, which approximates the power of the SOI, i.e. the HDTV signal, plus the power of the NTSC interference signal at $\omega_c$, from the first power estimation circuit block 292 and the signal C, which approximates the power of the SOI, from the second power estimation circuit 294.

The threshold compare circuit compares the value of the received signals B and C to determine the amount of NTSC interference present. If the NTSC interference is determined to be sufficiently large that the use of the filter 212, with a fixed gain, will increase signal detection probability, the switches 354, 355 are closed so that the I- and Q- portions of the NTSC interference signal isolated by the filter 212 will be subtracted from the corresponding I- and Q- received television signals.

To determine the amount of NTSC interference present and whether the switches 354, 355 should be closed, the threshold compare circuit 308 compares the estimated power of the SOI plus NTSC interference signal, B, to the estimated power of the SOI, C to generate a power ratio of B:C. The result of the compare operation, e.g., the power ratio, is indicative of the amount of NTSC interference present.

Based on the ratio of B:C, the threshold compare circuit 308 outputs a signal to close the switches 354, 355 whenever the power ratio of B:C is greater than or equal to, two to one, and to open the switch when the power ratio is less than two to one.

In this manner, the gain of the gain control circuit 242 determines that the gain of the I- and Q- filtered televisions signals output by the filter 212 is either G, the value determined by the fixed weight elements 300, 301 or zero, the value resulting from the switches 354, 355 from being put in the open position.

In one embodiment of the present invention, a single fixed gain filter 212, 214, or 216 includes a gain control circuit 242 with first and second power estimating circuit blocks 292, 294 and a threshold compare circuit 308. The output of the threshold compare circuit 308 is coupled to the switches 300, 301 of each of the filters 212, 214, 216 to control the switches for connecting and disconnecting each of the filters 212, 214, 216. In this manner, the need for more than a single first power estimating circuit block 292 and a single second power estimating circuit block 294 is eliminated.

While the above complex embodiment, includes a gain control circuit 242 which uses fixed gain elements 300, 301 which are selectively coupled to the output of the complex filter circuit 212, to control the gain of the complex filter circuit 212, it is possible to implement the complex filter 212 with a gain control circuit 242 that adaptively adjusts gain for optimal performance as described previously in regard to the real NTSC interference canceler embodiment.

In alternative embodiments of the real and complex NTSC interference cancelers 10, 210 of the present invention, multiple NTSC interference cancelers are placed in series with each other. Such embodiments permit each NTSC canceler to be constructed with a lower degree of numerical precision, in terms of filter coefficients, multiplier and accumulator widths, than would otherwise be required to achieve the same degree of cancellation. While this embodiment may require more hardware to implement than embodiments which do not place NTSC cancelers in series, it has the advantage of allowing for easier filter stage designs in view of the potential to use high clock speeds.

While the embodiments of the NTSC interference canceler of the present invention described above generally include real or complex digital notch filters with adjustable center frequencies, it is possible to implement the interference canceler of the present invention using notch filters with fixed center frequencies. In such embodiments, a frequency control signal my be supplied by the interference canceler of the present invention to, e.g., the tuner 6 or 206 which can then adjust the I.F. frequency to compensate for tuner inaccuracies and adjust the I.F. frequency so that the NTSC interference signal components will be located at the center frequencies of the notch filters used in the present invention. The use of recursive digital notch filters with fixed center frequencies greatly simplifies the overall filter design by permitting the use of fixed weight elements in many cases where adjustable weight elements would otherwise have to be used.

Figure 16A:
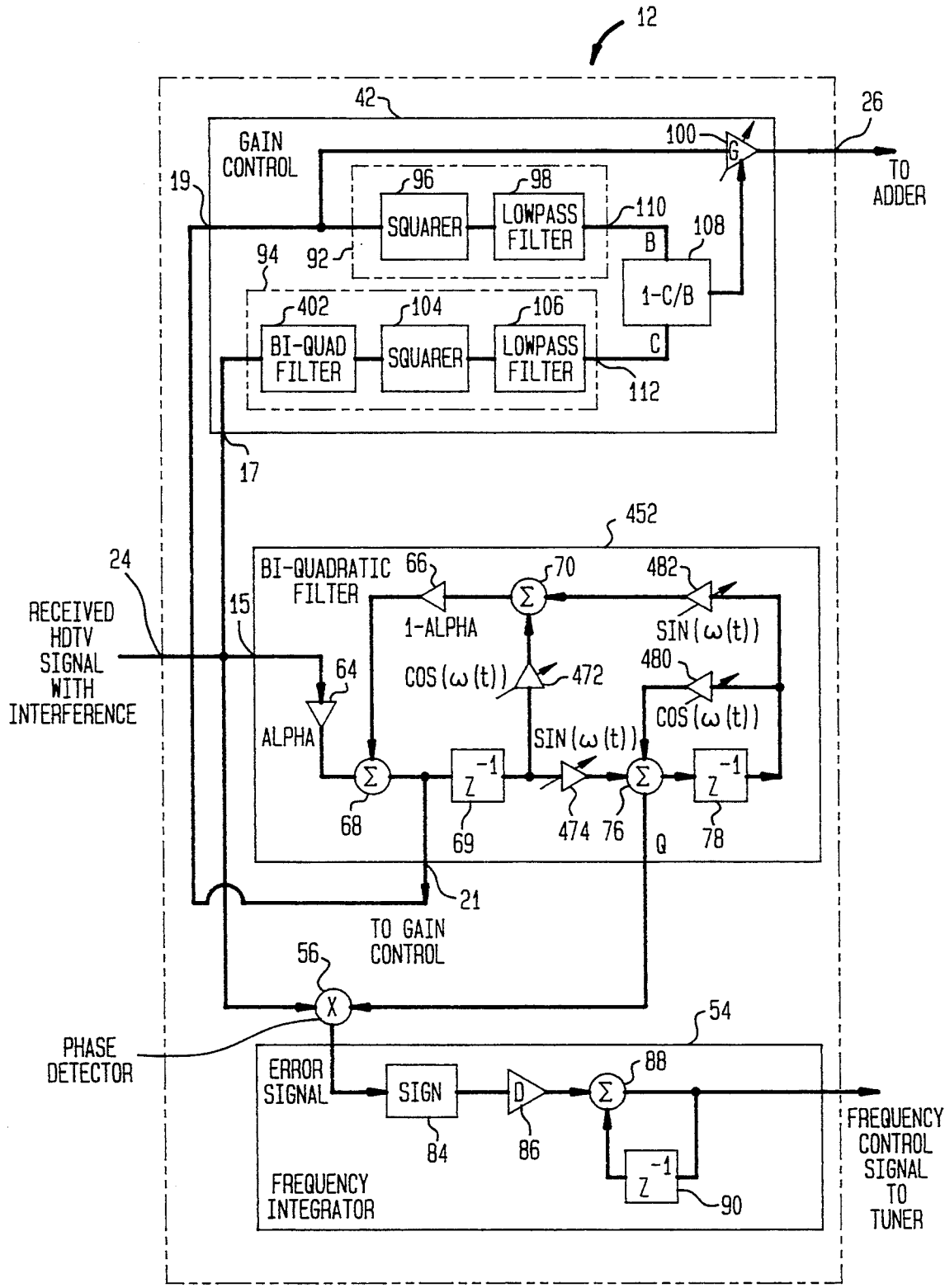
FIGS. 16a and 16b are schematic block diagrams of exemplary embodiments of recursive filters having fixed center frequencies that can be used in one embodiment of the present invention as any one of the filters of a NTSC signal interference canceler.
Figure 16B:
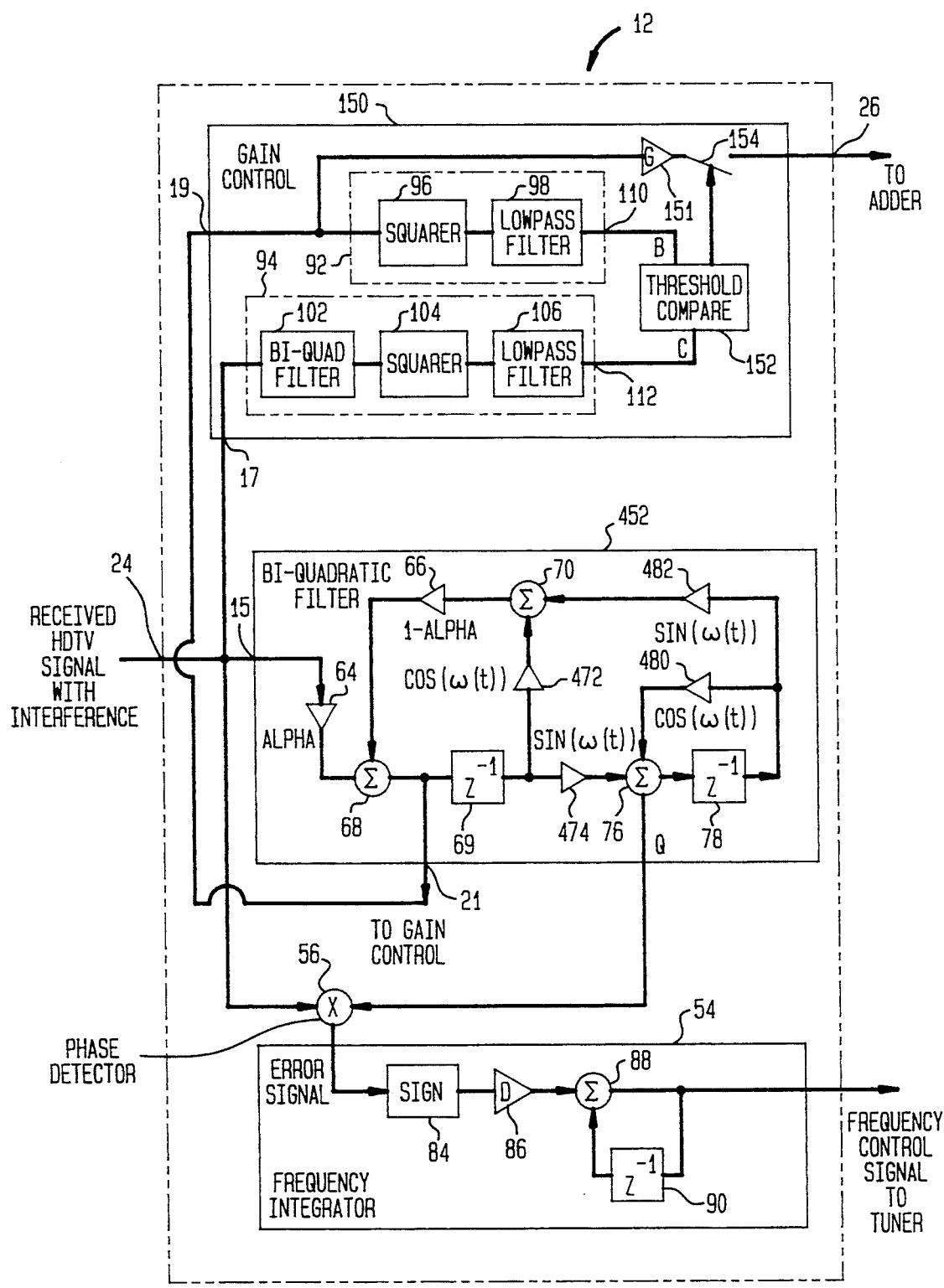

Referring now to FIGS. 16a and 16b, there are illustrated exemplary embodiments of the filter 12 with fixed center frequencies. In the embodiments illustrated in FIGS. 16a and 16b, the same reference numerals as used in FIGS. 7a and 7b are used to refer to elements which are the same as, or similar to, the elements used in the embodiments of FIGS. 16a and 16b. Accordingly, these common elements will not be described again here. In addition, the basic interconnection of the elements in FIGS. 16a and 16b is generally the same as illustrated in FIGS. 7a and 7b.

The primary difference between the embodiments of the filter 12 illustrated in FIGS. 7a and 7b and FIGS. 16a and 16b, is the replacement of the bi-quadratic filter circuits 52 and 102, which have adjustable center frequencies, with bi-quadratic filters 452 and 402, respectively, which have fixed center frequencies. In addition, the output of the frequency integrator 54, which generates a frequency error signal, is supplied to a frequency error signal output of the filter 12 which is connected to the tuner and not to inputs of the bi-quadratic filter circuit 452 or gain control circuit 42. In this manner, the tuner and not the components of the filters 12, 14, 16 of the NTSC canceler of the present invention, receives the frequency error signal and adjusts the frequency of the television signal to insure that the NTSC signal components fall within the center of the notches of the fixed recursive digital notch filters 12, 14, 16.

As illustrated in FIGS. 16a and 16b, the bi-quadratic filter 452, with its fixed center frequency, is substantially the same as hi-quadratic filter circuit 52, however, the bi-quadratic filter circuit 452 uses fixed weight elements 472, 474, 480, 482 having fixed gains which are a function of the fixed preselected center frequency $\omega_t$ of the filter circuit 452, as opposed to the variable weight elements 72, 74, 80, and 82 used to implement the bi-quadratic digital filter 52. The use of such fixed weight elements as opposed to variable weight elements simplifies the design of the bi-quadratic filter circuit 452 and provides for a less costly method of implementing the filter 12.

Similar modifications can be made to the complex filter 212 to produce a complex version of the NTSC interference canceler with notch filters having fixed center frequencies. Thus, it is possible to implement the NTSC canceler of the present invention using either real or complex recursive digital notch filters having fixed and/or adjustable center frequencies. Accordingly, it is possible to implement an NTSC interference canceler according to the present invention as either a real or complex filter implementation for each of the numerous embodiments described above.

The embodiments of the real and complex NTSC signal interference canceler of the present invention which use notch filters with fixed gains and center frequencies, offer advantages in terms of simplicity and thus low cost when compared to embodiments which incorporate notch filters with adjustable gains and/or center frequencies. However, embodiments which use notch filters with adjustable gains generally offer advantages in overall performance because of the ability to dynamically adjust the gain of the notch filters of the NTSC interference canceler for optimum overall NTSC interference signal cancellation.

In addition to the above described embodiments, it is possible to implement the NTSC interference canceler of the present invention by mapping the basic difference equations implemented by said cancelers into a form that can be pipelined. This approach can be used to produce a new filter structure that has unit delay elements arranged so that the arithmetic processing flow can be pipelined to ease the hardware speed requirements necessary to implement such an interference canceler.

I claim:

1. A system for attenuating interference present in an in-phase television signal and a quadrature-phase television signal, each of said in-phase and quadrature-phase television signals including a HDTV signal, the system comprising:

a complex recursive digital notch filter having a first input for receiving the in-phase television signal, a second input for receiving the quadrature-phase television signal, an in-phase signal output, a quadrature-phase signal output, and a notch centered at the frequency of a preselected interference signal, the complex recursive digital notch filter including:

i. means for detecting the presence of the preselected interference signal in the in-phase and quadrature-phase television signals; and ii. means for filtering the preselected interference signal to remove the preselected interference signal from the in-phase and quadrature-phase television signals when the interference signal is detected, and for passing the in-phase and quadrature-phase television signals without filtering at all other times.

2. The system of claim 1 wherein the complex digital notch filter comprises:

a complex recursive passband filter circuit having an in-phase signal input coupled to the first input of said complex recursive digital notch filter, a quadrature phase signal input coupled to the second input of said complex recursive digital notch filter, an in-phase NTSC interference signal component output, a quadrature-phase NTSC interference signal component output and a passband centered at the carrier frequency of the preselected NTSC signal component for isolating the preselected NTSC signal component;

a first summer having a summing input coupled the first input of said complex recursive digital notch filter, a subtracting input, and an output coupled to the in-phase signal output of said complex recursive digital notch filter;

means for detecting the presence of the preselected NTSC interference signal component; and means for selectively coupling the in-phase NTSC interference signal component output of the complex recursive passband filter circuit to the first subtracting input of the first summer when the presence of the preselected NTSC interference signal component is detected, said first summer subtracting the in-phase NTSC interference component signal output by the complex recursive passband filter circuit from the in-phase television signal to attenuate the preselected NTSC signal component of the in-phase television signal.

3. The system of claim 2, wherein the means for selectively coupling includes a fixed gain control circuit for controlling the gain of the in-phase NTSC interference signal component.

4. A system for attenuating NTSC interference present in an in-phase television signal and a quadrature-phase television signal, each of said in-phase and quadrature-phase television signals including a HDTV signal and an NTSC interference signal, the system comprising:

a complex recursive digital notch filter having a first input for receiving the in-phase television signal, a second input for receiving the quadrature-phase television signal, an in-phase signal output, a quadrature-phase signal output, and a notch centered at the carrier frequency of a preselected NTSC signal component of the in-phase and quadrature phase television signals for attenuating the preselected NTSC signal component of the in-phase and quadrature-phase television signals; wherein the complex digital notch filter includes:

a complex recursive passband filter circuit having an in-phase signal input coupled to the first input of said complex recursive digital notch filter, a quadrature phase signal input coupled to the second input of said complex recursive digital notch filter, an in-phase NTSC interference signal component output, a quadrature-phase NTSC interference signal component output and a passband centered at the carrier frequency of the preselected NTSC signal component for isolating the preselected NTSC signal component by passing the preselected NTSC signal component; and a first summer having a summing input coupled to the first input of said complex recursive digital notch filter, a subtracting input coupled to the in-phase NTSC interference signal component output of the complex recursive passband filter circuit, and an output coupled to the in-phase signal output of said complex recursive digital notch filter, said first summer for subtracting an in-phase NTSC interference component signal output by the complex recursive passband filter circuit from the in-phase television signal to attenuate the preselected NTSC signal component of the in-phase television signal.

5. The system of claim 4, wherein said complex recursive digital notch filter further comprises:

a second summer having a summing input coupled to the second input of said complex recursive digital notch filter, a subtracting input coupled to the quadrature-phase NTSC interference component signal output of the complex recursive passband filter circuit, and an output coupled to the quadrature-phase signal output of said complex recursive digital notch filter, said second summer for subtracting a quadrature-phase NTSC interference component signal output by the complex recursive passband filter circuit from the quadrature-phase television signal to attenuate the preselected NTSC signal component of the quadrature-phase television signal.

6. The system of claim 4 wherein the complex recursive digital notch filter further comprises:

means for estimating the power level of the preselected NTSC interference signal component; and a gain control circuit coupled to the in-phase NTSC interference signal component output of the complex recursive passband filter circuit, and to the subtracting input of said first summer for adaptively adjusting the amplitude of the in-phase NTSC interference signal component as a function of the estimated power level of the preselected NTSC interference signal component.

7. The system of claim 6, wherein the gain control circuit adjusts the amplitude of the in-phase NTSC interference signal component to a level whereat the power level of the in-phase NTSC interference signal component approximates the estimated power level of the preselected NTSC interference signal component.

8. The system of claim 4, wherein the complex recursive digital notch filter further comprises:

means for estimating the power level of the preselected NTSC interference signal component; and a gain control circuit coupled to the quadrature-phase NTSC interference signal component output of the complex recursive passband filter circuit, and to the subtracting input of said second summer for adaptively adjusting the amplitude of the quadrature-phase NTSC interference signal component as a function of the estimated power level of the preselected NTSC interference signal component.

9. The system of claim 8, wherein the gain control circuit adjusts the amplitude of the quadrature-phase NTSC interference signal component to a level whereat the power level of the quadrature-phase NTSC interference signal component approximates the estimated power level of the preselected NTSC interference signal component.

10. The system of claim 4, wherein the complex digital notch filter further comprises:

means for detecting the carrier frequency of the preselected NTSC interference signal component; and means for adaptively adjusting the center frequency of the complex recursive passband filter circuit to match the detected carrier frequency of the preselected NTSC interference signal component.

11. The system of claim 4, wherein said passband of the complex recursive passband filter circuit has a fixed center frequency corresponding to the carrier frequency of the preselected NTSC signal component when the in-phase and quadrature-phase television signals are adjusted to a preselected baseband frequency.

12. The system of claim 11, wherein the complex digital notch filter further comprises:

means for detecting the carrier frequency of the preselected NTSC interference signal component; and means for adjusting, as a function of the detected carrier frequency of the preselected NTSC interference signal component, the frequency of the in-phase and quadrature-phase television signals to a preselected baseband frequency.

13. The system of claim 12, wherein said means for adjusting the frequency of the in-phase and quadrature phase television signals to a preselected baseband frequency includes a tuner.

14. A method of attenuating an NTSC interference signal from a complex television signal, the complex television signal including an in-phase television signal and a quadrature-phase television signal, each of said in-phase and quadrature phase television signals including a HDTV signal, the method comprising the steps of:

providing a complex recursive digital notch filter having a complex television signal input, a complex filtered television signal output, and a notch centered at the frequency of a preselected NTSC interference signal component;

supplying the complex television signal to the complex input of the complex recursive digital notch filter;

monitoring the complex television signal to detect the presence of the preselected NTSC interference signal component; and operating the complex recursive digital notch filter to filter the complex television signal to attenuate the preselected NTSC interference signal component only when the presence of the preselected NTSC signal interference signal component is detected.

15. The method of claim 14, further comprising the steps of:

providing means for adjusting the frequency of the complex television signal;

providing means for detecting the carrier frequency of the preselected NTSC interference signal component; and adjusting the frequency of the complex television signal in order to adjust the carrier frequency of the preselected NTSC signal component to match the center frequency of the complex recursive digital notch filter.

16. A method of attenuating an NTSC interference signal present in a complex television signal, the complex television signal including an in-phase television signal and a quadrature-phase television signal, each of said in-phase and quadrature phase television signals including a HDTV signal and an NTSC interference signal, the method comprising the steps of:

providing a complex recursive digital notch filter having a complex television signal input, a complex filtered television signal output, and a notch centered at a frequency of a preselected NTSC interference signal component;

supplying the complex television signal to the complex input of the complex recursive digital notch filter; and operating the complex recursive digital notch filter to filter the complex television signal to attenuate the preselected NTSC signal component and to generate a complex filtered television signal;

the step of operating the complex recursive digital notch filter including the steps of:

estimating the power level of the preselected NTSC signal component;

adaptively adjusting the gain of the complex recursive digital notch filter as a function of the estimated power level of the preselected NTSC interference signal component to remove approximately all of the preselected NTSC interference signal component.

17. The method of claim 16, further comprising the steps of:

detecting the center frequency of the preselected NTSC interference signal component; and adaptively adjusting the center frequency of the complex recursive digital notch filter to correspond to the center frequency of the preselected NTSC interference signal component.

18. A filter for removing a preselected NTSC interference signal component from an intercarrier frequency (I.F.) television signal, the filter comprising:

a fixed gain recursive digital notch filter having a notch centered at the nominal carrier frequency of a preselected NTSC signal component of the television signal and adapted for coupling to a tuner for receiving the intercarrier frequency television signal, for isolating the preselected NTSC interference signal component from the received television signal by passing the preselected NTSC signal component and for outputting the isolated NTSC signal component;

a summing circuit adapted for coupling to the tuner and selectively coupled to the recursive digital notch filter for receiving the isolated NTSC signal component and for subtracting the isolated NTSC signal component from the intercarrier frequency television signal; and means for detecting the carrier frequency of the preselected NTSC signal component and for generating a frequency error Signal when the detected carrier frequency of the preselected NTSC signal component differs from said nominal carrier frequency.

19. The filter of claim 18, further comprising:

means for detecting the presence of the preselected NTSC signal component and for selectively coupling the fixed gain recursive digital notch filter to the summing circuit when the presence of the preselected NTSC interference signal component is detected.

20. A filter for removing a preselected NTSC interference signal component from an intercarrier frequency (I.F.) television signal, the filter comprising:

an adjustable gain recursive digital notch filter having a notch centered at the nominal carrier frequency of a preselected NTSC interference signal component of the television signal and adapted for coupling to a tuner for receiving the intercarrier frequency television signal, for isolating the preselected NTSC interference signal component from the received television signal by passing the preselected NTSC interference signal component and for outputting the isolated NTSC interference signal component;

a summing circuit adapted for coupling to the tuner and coupled to the recursive digital notch filter for receiving the isolated NTSC interference signal component and for subtracting the isolated NTSC interference signal component from the intercarrier frequency television signal;

means for detecting the carrier frequency of the preselected NTSC interference signal component and for generating a frequency error signal when the detected carrier frequency of the preselected NTSC interference signal component differs from said nominal carrier frequency; and means for adjusting the intercarrier frequency of the television signal as a function of the frequency error signal, to thereby adjust the carrier frequency of the preselected NTSC interference signal component to correspond to the nominal carrier frequency of the preselected NTSC interference signal component.

* * * * *